(12) United States Patent
Ciasulli

(10) Patent No.: US 12,516,760 B2
(45) Date of Patent: Jan. 6, 2026

(54) PRESSURE-TEMPERATURE PORT CONNECTIONS FOR HEAT-TRANSFER DEVICES

(71) Applicant: Victaulic Company, Easton, PA (US)

(72) Inventor: Andrew Michael Ciasulli, Center Valley, PA (US)

(73) Assignee: VICTAULIC COMPANY, Easton, PA (US)

( * ) Notice: Subject to any disclaimer, the term of this patent is extended or adjusted under 35 U.S.C. 154(b) by 70 days.

(21) Appl. No.: 18/658,818

(22) Filed: May 8, 2024

(65) Prior Publication Data
US 2024/0377008 A1 Nov. 14, 2024

Related U.S. Application Data

(60) Provisional application No. 63/464,838, filed on May 8, 2023.

(51) Int. Cl.
*F16L 29/04* (2006.01)
*F16L 25/00* (2006.01)
(Continued)

(52) U.S. Cl.
CPC .............. *F16L 29/04* (2013.01); *F16L 29/02* (2013.01); *F16L 25/0036* (2013.01); *F28F 9/266* (2013.01)

(58) Field of Classification Search
CPC . F16L 29/02; F16L 29/04; F16L 29/00; F16L 25/0036; F28F 9/266
See application file for complete search history.

(56) References Cited

U.S. PATENT DOCUMENTS 5,199,752 A * 4/1993 Sanders .............. F16L 25/0036
5,553,893 A * 9/1996 Foti
(Continued)

FOREIGN PATENT DOCUMENTS

EP     2290152 B1 *  2/2012
JP     H11304051 A   11/1999

OTHER PUBLICATIONS

International Search Report and Written Opinion issued Aug. 22, 2024.
(Continued)

*Primary Examiner* — William S. Choi
(74) *Attorney, Agent, or Firm* — Panitch Schwarze Belisario & Nadel LLP

(57) ABSTRACT

A kit for joining a fluid conduit to a fluid-based heat-transfer device includes a hose and a port body with a port-body-hose end with a port-body-hose opening, a port-body-connector end with a port-body-connector opening, and a port-body bore extending between the port-body-hose opening and the port-body-connector opening. A port aperture passes through an exterior wall and in fluid communication with the port-body bore. The port-body-hose opening is sealingly, non-rotatably, and non-removably joined to the first hose end. A first connector nut is rotatably and non-removably coupled to the port-body-connector opening. A second connector nut rotatably and non-removably coupled to the second hose end. Upstream and downstream tailpieces each have a conduit end sealingly connectable to respective upstream-fluid and downstream-fluid conduits and each have a connector end removably and selectively connectable to the first connector nut and the second connector nut. A system and method are also disclosed.

28 Claims, 14 Drawing Sheets

(51) Int. Cl.
  *F16L 29/02* (2006.01)
  *F28F 9/26* (2006.01)

(56) References Cited

U.S. PATENT DOCUMENTS

| | | |
|---|---|---|
| 12,366,313 B2 * | 7/2025 | Wu |
| 2003/0079697 A1 | 5/2003 | Rocheleau |
| 2014/0261725 A1 | 9/2014 | Karamanos |
| 2016/0076683 A1 * | 3/2016 | Bishoff ............... F16L 25/0036 |
| 2017/0227250 A1 | 8/2017 | Karamanos |
| 2018/0266711 A1 | 9/2018 | Karamanos |
| 2020/0300459 A1 * | 9/2020 | Steusloff |
| 2023/0160645 A1 | 5/2023 | Fowls |
| 2023/0193600 A1 * | 6/2023 | Gu ..................... F16L 25/0036 |

OTHER PUBLICATIONS

Victaulic, Installation and Maintenance Instructions, IKOIL-KIT™ Coil Pack—Series 799, Series 79V with ATC Valve, Series 79B with Bypass, and Series 79A with Bypass and ATC Valve, 6 pages, May 1, 2021.

Victaulic, Brochure, KOIL-KIT™ Coil Pack, Series 799/79V/79B/79A, Series 78Y/78T/78U and Coil Hoses, 17 pages, Sep. 1, 2021.

\* cited by examiner

PRESSURE-TEMPERATURE PORT CONNECTIONS FOR HEAT-TRANSFER DEVICES

CROSS-REFERENCE TO RELATED APPLICATIONS

This application claims the benefit of priority under 35 USC § 119(e) of U.S. Provisional Patent Application No. 63/464,838 filed May 8, 2023, the contents of which are incorporated herein by reference.

BACKGROUND OF THE DISCLOSURE

The present disclosure generally relates to heat-transfer systems, and may more particularly relate to heat-transfer systems including a plurality of heat-transfer devices. The heat-transfer devices may be used for providing heat to or removing heat from a space by transferring heat to or from an atmosphere in the space via heated or chilled liquid or other fluid. An example of such a heat-transfer device is shown in FIG. 1 of the present application and will be described further below.

A heat-transfer system may commonly include two or more heat-transfer devices served by a common source of heat-transfer fluid in the form of heated or chilled fluid-most commonly, by a source of heated or chilled fluid comprising liquid water. Such heat-transfer systems may be balanced to regulate the flow rate of heat-transfer fluid provided to each heat-transfer device in the system. The balancing process, which is known as hydronic balancing, employs one or more balancing valves to regulate the relative flow resistance among the different heat-transfer devices in the system, as a result regulating the relative flow rates of heat-transfer fluid through the different heat-transfer devices in the system.

To monitor the balancing process, and to facilitate various functions in the operation of such heat-transfer devices, one or more ports are provided for access to the heat-transfer fluid within the system or a fluid path thereof. The ports are sometimes known as pressure-temperature ports or "PT ports" because one or more pressure or temperature probes are commonly inserted into the ports to measure the pressure or temperature of the heat-transfer fluid during balancing or other servicing of the heat-transfer device. The ports have other uses as well, including use for bleeding air from the system. The ports are commonly installed in proximity to a heat-transfer device, adjacent to a connecting hose or pipe leading to the heat-transfer device from a source of heat-transfer fluid or to a return for the heat-transfer fluid. The return may be a reservoir, piping system, piping loop connected to a system for heating and/or chilling the heat-transfer fluid, or other downstream configuration capable of receiving the fluid flow.

During installation of the hose and one or more ports in a building or other facility, the heat-transfer device is connected at an inlet to a source of heat-transfer fluid, and at an outlet to a return. Such installation commonly occurs after other building structures or systems have been installed in the same space in the building or facility, and a hose-based connection is desirable to allow flexibility in positioning and routing the connection to avoid structures or systems already present in the space.

For example, to form the necessary connection on the upstream side of the heat-transfer device, a hose may be connected to extend between the source of the heat-transfer fluid and the inlet of the heat-transfer device. In the contemplated use, the inlet of the heat-transfer device may be connected to a downstream end of the hose. To connect the inlet to the downstream end of the hose, the inlet of the heat-transfer device may have a first tailpiece fixed thereto. The first tailpiece may engage a fitting at the downstream end of the hose, such as a fixed male fitting fixed by crimping, a barb, or otherwise to the downstream end of the hose and compatible with the first tailpiece, either directly or via one or more intervening adapters or other fittings. (Here a "fixed" fitting is a fitting not independently rotatable relative to the item to which the fitting is attached.) The opposite, upstream end of the hose also carries a fitting, which may include a fixed male fitting, which requires an intervening fitting to engage a port body providing a fixed male thread for connection. The port body may be a stand-alone item or may be integrally formed as part of the body of a valve; in either case, the upstream end of the hose is connected to a fixed fitting of the port body, typically a fixed male thread of the port body. An upstream end of the port body (or valve body integral with the port body) typically engages a second tailpiece having a fixed connector connected to the source. The upstream end of the port body or valve body is connected to an adapter, and the adapter in turn connects to the second tailpiece. The first tailpiece and the second tailpiece commonly differ in type of male or female fixed connector made available for connection.

Installation in the field often involves some experimentation by the installer to determine the proper location for the end of the hose carrying the port of the port body, which is properly located at a higher elevation than the opposite end of the hose to serve, for example, as an effective vent for bleeding air from the system. If the installer in the field needs to reverse the orientation of the hose, in order to (for example) relocate the port body and a port thereof, the reversal process is cumbersome, as the installer must use fittings and adapters to form a compatible connection between the first tailpiece and the port body or valve body at the second end of the hose, and to form a compatible connection between the second tailpiece and first end of the hose. The reversal process is generally cumbersome because the first tailpiece and the second tailpiece typically are different and are compatible with different male and female connectors. As a result, either the installer either remove and replace the first tailpiece and the second tailpiece, or the installer must build up a compatible connection between the first tailpiece and the port body or valve body at the second end of the hose, as well as between the second tailpiece and the first end of the hose, using adapters to form a transition between otherwise incompatible connectors. The adapters forming the transition between otherwise incompatible connectors take up additional space, which may cause installation issues in a crowded space. Further, reversing the orientation of the installation requires additional parts that must be either retained in stock at increased cost or obtained, potentially leading to delay for receipt of ordered parts. Even if the necessary parts are available, reversal requires considerable effort and time of the installer to either remove and replace the tailpieces, or to build up a compatible connection on each end of the hose. The use of additional fittings and adapters increases resistance to flow and thus reduces efficiency. Moreover, the incorporation of additional fittings and adapters increases the number of joints and, as a result, the number of potential locations for leakage.

The present disclosure relates to kits, systems, and methods for connecting a hose and one or more of a PT port to an upstream-fluid conduit to an upstream-fluid conduit and a downstream-fluid conduit in fluid communication with a fluid-based heat-transfer device The present disclosure also relates to kits, systems, and methods for connecting a balancing valve in a fluid-based heat-transfer system.

SUMMARY

Briefly stated, in some embodiments, a system is configured for connecting an upstream-fluid conduit to a downstream-fluid conduit in fluid communication with a fluid-based heat-transfer device. The system comprises a hose, and the hose comprises a first hose end and a second hose end and a hose bore. The system also includes a port body having an exterior wall, a port-body-hose end with a port-body-hose opening, a port-body-connector end with a port-body-connector opening, a port-body bore extending between the port-body-hose opening and the port-body-connector opening, and a port aperture passing through the exterior wall and in fluid communication with the port-body bore, with the port-body-hose opening being sealingly, non-rotatably, and non-removably joined to the first hose end, with the port-body bore in fluid communication with the hose bore. The system also includes a first connector nut rotatably and non-removably coupled to the port-body-connector opening; a second connector nut rotatably and non-removably coupled to the second hose end; an upstream tailpiece having a conduit end sealingly connected to the upstream-fluid conduit and having a connector end removably connectable to the first connector nut; and a downstream tailpiece having a conduit end sealingly connected to the downstream-fluid conduit and having a connector end removably connectable to the second connector nut. The upstream tailpiece is configured to be removably connectable to the second connector nut, and the downstream tailpiece is configured to be removably connectable to the first connector nut.

In another example, a system is configured for connecting to an upstream-fluid conduit and a downstream-fluid conduit in fluid communication with a fluid-based heat-transfer device. The system comprises a hose comprising a first hose end and a second hose end and a hose bore. The system also includes a first-port body having a first-exterior wall, a first-port-body-hose opening, a first-port-body-connector opening, a first-port-body bore extending between the first-port-body-hose opening and the first-port-body-connector opening, and a first-port aperture passing through the first-exterior wall an in fluid communication with the first-port-body bore, with the first-port-body-hose opening being sealingly, non-rotatably, and non-removably joined to the first hose end, with the first-port-body bore in fluid communication with the hose bore; and a first connector nut rotatably and non-removably coupled to the port-body-connector opening. The system also includes a second-port body having a second-exterior wall, a second-port-body-hose opening, a second-port-body-connector opening, a second-port-body bore extending between the second-port-body-hose opening and the second-port-body-connector opening, and a second-port aperture passing through the second-exterior wall in in fluid communication with the second-port-body bore, with the second-port-body-hose opening being sealingly, non-rotatably, and non-removably joined to the second hose end, with the second-port-body bore in fluid communication with the hose bore. The system also includes a second connector nut rotatably and non-removably coupled to the second-port-body-connector opening; an upstream tailpiece having a conduit end sealingly connected to the upstream-fluid conduit and having a connector end removably connectable to the first connector nut; and a downstream tailpiece having a conduit end sealingly connected to the downstream-fluid conduit and having a connector end removably connectable to the second connector nut. The upstream tailpiece is configured to be removably connectable to the second connector nut, and the downstream tailpiece is configured to be removably connectable to the first connector nut.

In another example, a kit is configured for connecting an upstream-fluid conduit to a downstream-fluid conduit in fluid communication with a fluid-based heat-transfer device. The kit comprises a hose comprising a first hose end and a second hose end and a hose bore. The kit also comprises a port body having an exterior wall, a port-body-hose end with a port-body-hose opening, a port-body-connector end with a port-body-connector opening, a port-body bore extending between the port-body-hose opening and the port-body-connector opening, and a port aperture passing through the exterior wall an in fluid communication with the port-body bore, with the port-body-hose opening being sealingly, non-rotatably, and non-removably joined to the first hose end, with the port-body bore in fluid communication with the hose bore. The kit also comprises a first connector nut rotatably and non-removably coupled to the port-body-connector opening; a second connector nut rotatably and non-removably coupled to the second hose end; an upstream tailpiece having a conduit end configured to be sealingly connectable to the upstream-fluid conduit and having a connector end removably connectable to the first connector nut; and a downstream tailpiece having a conduit end configured to be sealingly connectable to the downstream-fluid conduit and having a connector end removably connectable to the second connector nut. The upstream tailpiece is configured to be removably connectable to the second connector nut, and the downstream tailpiece is configured to be removably connectable to the first connector nut.

In another example, a kit is configured for connecting to an upstream-fluid conduit and a downstream-fluid conduit in fluid communication with a fluid-based heat-transfer device. The kit comprises a hose comprising a first hose end and a second hose end and a hose bore. The kit also includes a first-port body having a first-exterior wall, a first-port-body-hose opening, a first-port-body-connector opening, a first-port-body bore extending between the first-port-body-hose opening and the first-port-body-connector opening, and a first-port aperture passing through the first-exterior wall an in fluid communication with the first-port-body bore, with the first-port-body-hose opening being sealingly, non-rotatably, and non-removably joined to the first hose end, with the first-port-body bore in fluid communication with the hose bore. The kit also includes: a first connector nut rotatably and non-removably coupled to the port-body-connector opening; a second-port body having a second-exterior wall, a second-port-body-hose opening, a second-port-body-connector opening, a second-port-body bore extending between the second-port-body-hose opening and the second-port-body-connector opening, and a second-port aperture passing through the second-exterior wall in in fluid communication with the second-port-body bore, with the second-port-body-hose opening being sealingly, non-rotatably, and non-removably joined to the second hose end, with the second-port-body bore in fluid communication with the hose bore; a second connector nut rotatably and non-removably coupled to the second-port-body-connector opening; an upstream tailpiece having a conduit end configured to be sealingly connectable to the upstream-fluid conduit and having a connector end removably connectable to the first connector nut; and a downstream tailpiece having a conduit end configured to be sealingly connectable to the downstream-fluid conduit and having a connector end removably connectable to the second connector nut. The upstream tailpiece is configured to be removably connectable to the second connector nut, and the downstream tailpiece is configured to be removably connectable to the first connector nut.

An example of a method is provided for connecting an upstream-fluid conduit to a downstream-fluid conduit in fluid communication with a fluid-based heat-transfer device. The method comprises: sealingly connecting an upstream tailpiece at a conduit end thereof to the upstream-fluid conduit, the upstream tailpiece having a connector end removably connectable to a first connector nut; and sealingly connecting a downstream tailpiece at a conduit end thereof to the downstream-fluid conduit, the downstream conduit having a connector end removably connectable to a second connector nut; engaging a connection device with the connector end of the upstream tailpiece and the connector end of the downstream tailpiece. The connection device comprises: a hose comprising a first hose end and a second hose end and a hose bore. The connection device also comprises a port body having an exterior wall, a port-body-hose end with a port-body-hose opening, a port-body-connector end with a port-body-connector opening, a port-body bore extending between the port-body-hose opening and the port-body-connector opening, and a port aperture passing through the exterior wall an in fluid communication with the port-body bore, with the port-body-hose opening being sealingly, non-rotatably, and non-removably joined to the first hose end, with the port-body bore in fluid communication with the hose bore. The connection device also includes a first connector nut rotatably and non-removably coupled to the port-body-connector opening, and a second connector nut rotatably and non-removably coupled to the second hose end. The upstream tailpiece is configured to be removably connectable to the second connector nut, and the downstream tailpiece is configured to be removably connectable to the first connector nut. The engaging the connection device with the connector end of the upstream tailpiece and with the connector end of the downstream tailpiece includes: tightening the first connector nut with respect to the upstream tailpiece; and tightening the second connector nut with respect to the downstream tailpiece.

An example of a method is provided for connecting an upstream-fluid conduit to a downstream-fluid conduit in fluid communication with a fluid-based heat-transfer device. The method comprises: sealingly connecting an upstream tailpiece at a conduit end thereof to the upstream-fluid conduit, the upstream tailpiece having a connector end removably connectable to a first connector nut; sealingly connecting a downstream tailpiece at a conduit end thereof to the downstream-fluid conduit, the downstream-fluid conduit having a connector end removably connectable to a second connector nut; and engaging a connection device with the connector end of the upstream tailpiece and the connector end of the downstream tailpiece. The connection device comprises a hose comprising a first hose end and a second hose end and a hose bore. The connection device also comprises a first-port body having a first-exterior wall, a first-port-body-hose opening, a first-port-body-connector opening, a first-port-body bore extending between the first-port-body-hose opening and the first-port-body-connector opening, and a first-port aperture passing through the first-exterior wall an in fluid communication with the first-port-body bore, with the first-port-body-hose opening being sealingly, non-rotatably, and non-removably joined to the first hose end, with the first-port-body bore in fluid communication with the hose bore. The connection device also includes a first connector nut rotatably and non-removably coupled to the port-body-connector opening. The connection device also comprises a second-port body having a second-exterior wall, a second-port-body-hose opening, a second-port-body-connector opening, a second-port-body bore extending between the second-port-body-hose opening and the second-port-body-connector opening, and a second-port aperture passing through the second-exterior wall in in fluid communication with the second-port-body bore, with the second-port-body-hose opening being sealingly, non-rotatably, and non-removably joined to the second hose end, with the second-port-body bore in fluid communication with the hose bore. The connection device also comprises a second connector nut rotatably and non-removably coupled to the second hose end. The engaging the connection device with the connector end of the upstream tailpiece and with the connector end of the downstream tailpiece includes: tightening the first connector nut with respect to the upstream tailpiece; and tightening the second connector nut with respect to the downstream tailpiece.

In any system, kit, or device disclosed herein, the first connector nut may have a first state wherein the first connector nut is rotatable with respect to the port body, and a second state wherein the first connector nut is fixed with respect to the port body, the second state providing for fixing of an orientation of the port body. In any system, kit, or device disclosed herein, the exterior wall, first-exterior wall, or second-exterior wall (or any element carrying a connector nut) may have a protrusion protruding exteriorly therefrom and encircling the port-body-connector opening, and the protrusion may be configured to capture the first connector nut or the second connector nut (or another connector nut) to limit an axial movement thereof. In any system, kit, or device disclosed herein, the connector nut or the first connector nut and the port body or the first-port body may be configured to engage the connector end of the upstream tailpiece or the downstream tailpiece to prevent rotation of the port body or the first-port body, and the second connector nut and the second-port body may be configured to engage the connector end of the upstream tailpiece or the downstream tailpiece to prevent rotation of the second-port body. In any system, kit, or device disclosed herein, any connector nut and any port body may be configured to engage the connector end of the upstream tailpiece or the downstream tailpiece to prevent rotation of the port body. In any system, kit, or device disclosed herein, any port aperture may be surrounded by a port-aperture wall, and the port-aperture wall may protrude from the exterior wall of the corresponding port body. Any system, kit, or device disclosed herein may further comprise a valve having a valve body with a first valve-body end with a first valve-body opening, and a second valve-body end with a second valve-body opening; a third connector nut rotatably and non-removably coupled to the first valve-body end; and wherein at least one of the upstream tailpiece or the downstream tailpiece is removably connectable to the third connector nut, so that the valve may be joined by way of the third connector nut to the third tailpiece. Any system, kit, or device disclosed herein may further comprise: a valve having a valve inlet and a valve outlet; a third connector nut rotatably and non-removably coupled to valve inlet; and a fourth connector nut rotatably and non-removably coupled to the valve outlet; wherein at least one of the upstream tailpiece or the downstream tailpiece is connected in fluid communication with a third tailpiece, and the third tailpiece has a connector end removably connectable to both the third connector nut and the fourth connector nut, so that one of the valve inlet or the valve outlet may be selectively connected to the third tailpiece In any method disclosed herein, the connection device may include elements of any system, kit, or device disclosed herein, including both required and optional elements thereof in any combination. Any method disclosed herein may further comprise, after completion of method steps disclosed herein, the following additional steps: disengaging the first connector nut from the upstream tailpiece; disengaging the second connector nut from the downstream tailpiece; re-orienting the connection device and re-engaging the connection device with the with the connector end of the upstream tailpiece and the connector end of the downstream tailpiece. Re-orienting the connection device and re-engaging the connection device with the with the connector end of the upstream tailpiece and the connector end of the downstream tailpiece may include: tightening the first connector nut with respect to the downstream tailpiece; and tightening the second connector nut with respect to the upstream tailpiece.

BRIEF DESCRIPTION OF THE SEVERAL VIEWS OF THE DRAWINGS

The following description of the disclosure will be better understood when read in conjunction with the appended drawings. However, the disclosure is not limited to the precise arrangements and instrumentalities shown. In the drawings.

DETAILED DESCRIPTION

Figure 1:
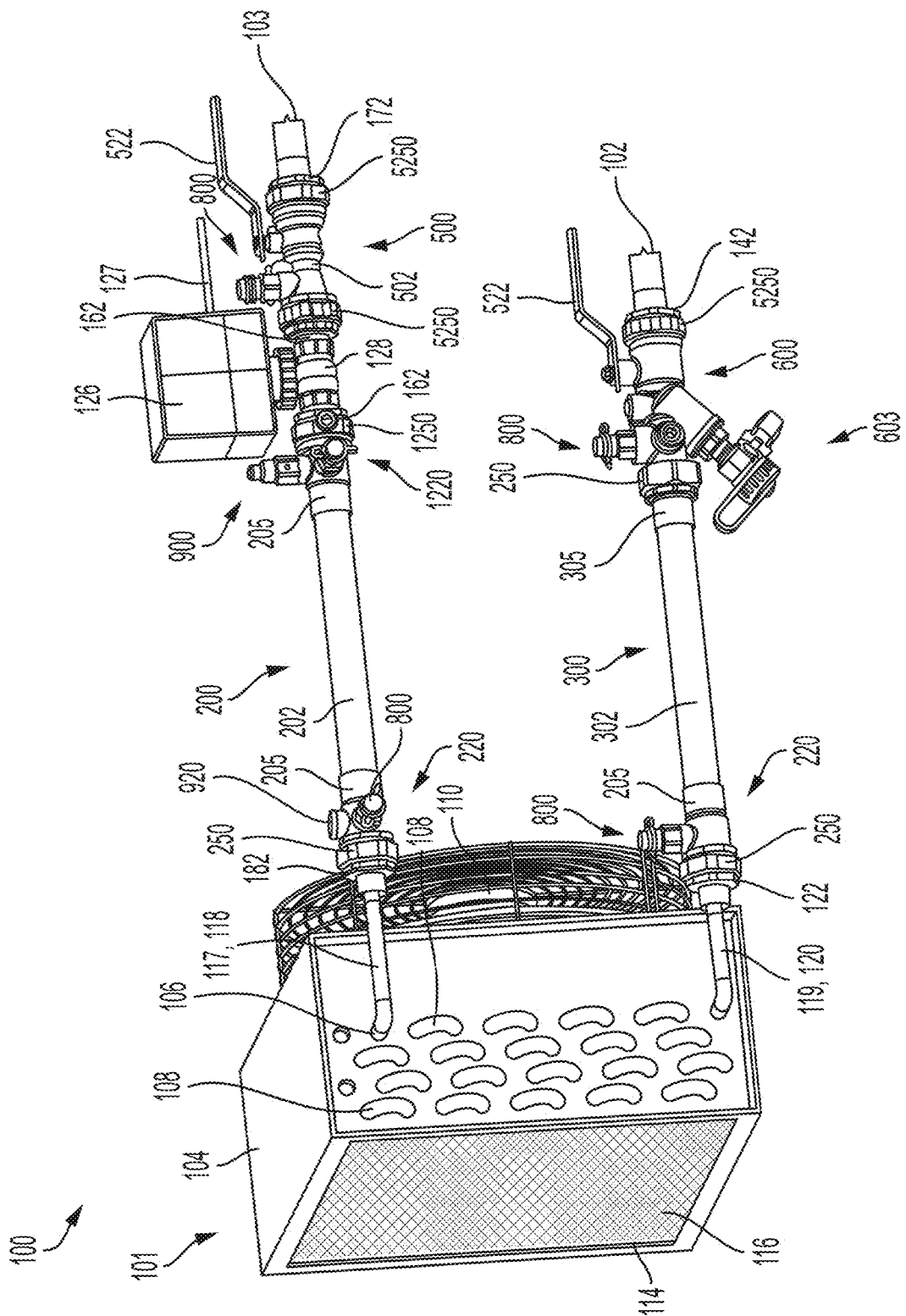
FIG. 1 is a perspective schematic view of a heat-transfer device of the present disclosure.
Figure 2:
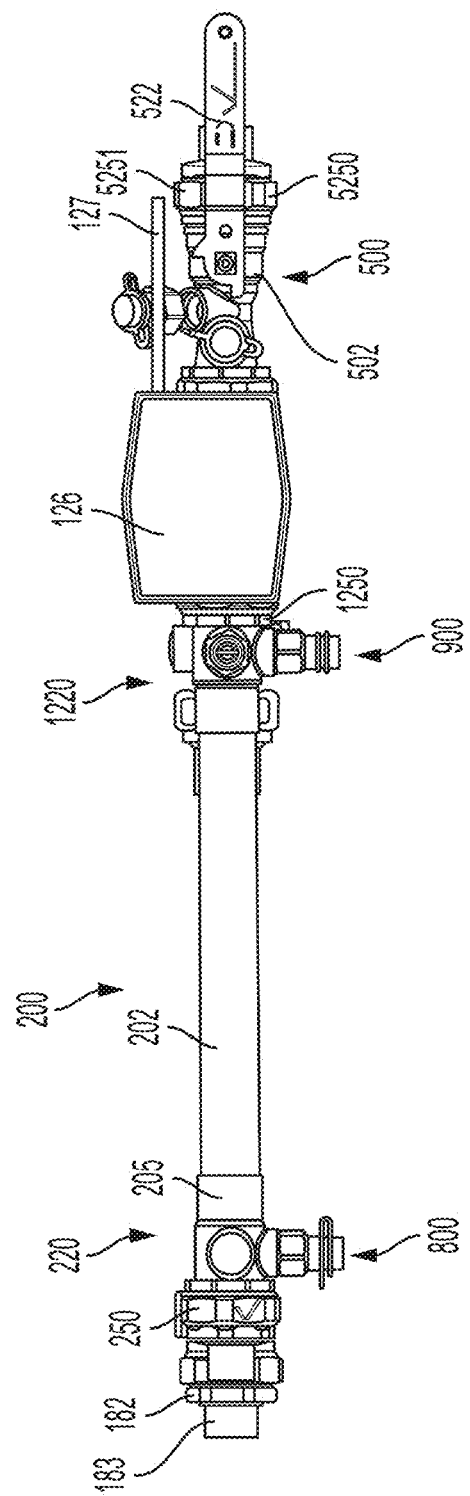
FIG. 2 is a top plan schematic view of an outlet assembly of the heat-transfer device of FIG. 1.
Figure 3:
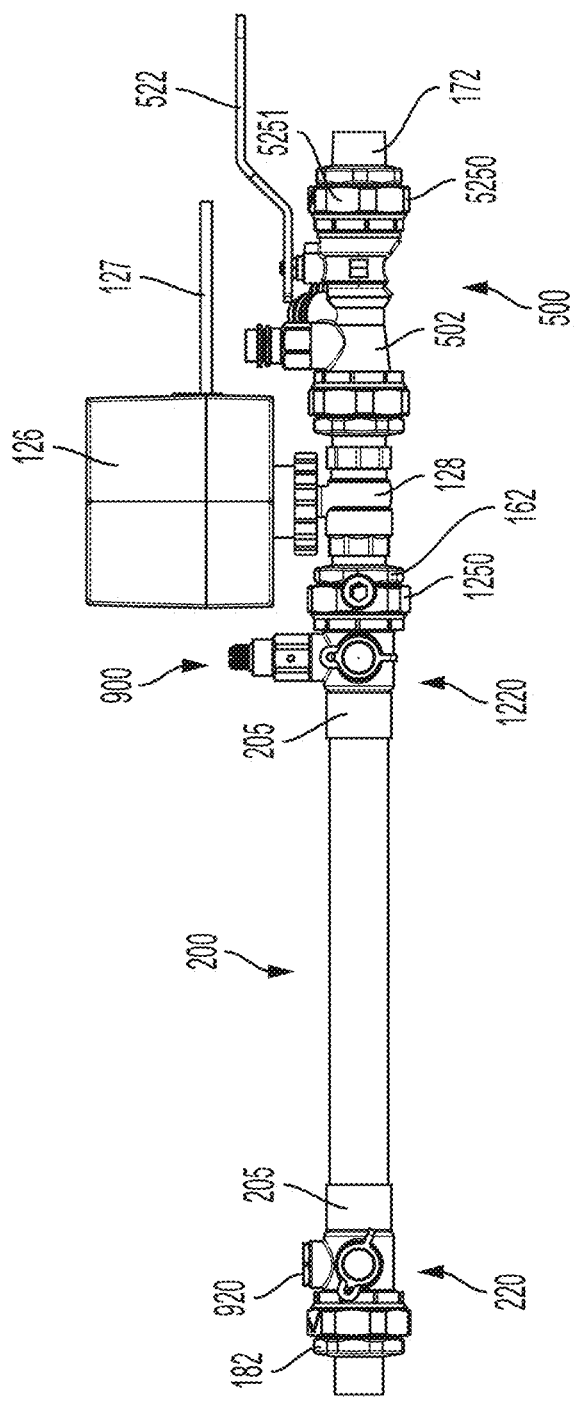
FIG. 3 is a side elevational schematic view of the outlet assembly of FIG. 1.

Certain terminology is used in the following description for convenience only and is not limiting. The words "right," "left," "lower," and "upper" designate directions in the drawings to which reference is made. The words "inner" and "outer" refer to directions toward and away from, respectively, the geometric center of an object and designated parts thereof. Unless specifically set forth otherwise herein, the terms "a," "an," and "the" are not limited to one element but instead should be read as meaning "at least one." "At least one" may occasionally be used for clarity or readability, but such use does not change the interpretation of "a," "an," and "the." Moreover, the singular includes the plural, and vice versa, unless the context clearly indicates otherwise. "Including" as used herein means "including but not limited to." The word "or" is inclusive, so that "A or B" encompasses A and B, A only, and B only. The terms "about," "approximately," "generally," "substantially," and like terms used herein, when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit thereof. As discussed in more detail below, references to "upstream" and "downstream" refer to the position of an upstream-fluid conduit or a downstream-fluid conduit with respect to the a hose with one or more port bodies or connector nuts attached; "upstream" and "downstream" do not refer to the location of elements with respect to the heat-transfer device 101. A "tailpiece" is used herein to reference a fluid connector connectable to a connector nut; a tailpiece most commonly is adapted to be fixed to a conduit (by a sweat or threaded connection) on a first end thereof and on a second end thereof includes male straight or tapered threads, a compression connector, or a grooved connector. The terminology set forth in this paragraph includes the words noted above, derivatives thereof and words of similar import.

Referring to the drawings in detail, wherein like numerals indicate like elements throughout, FIG. 1 is a perspective schematic view of an example of a heat-transfer system 100 including a fluid-based heat-transfer device 101 (referenced generally as "heat-transfer device 101"). The heat-transfer device 101 includes a housing 104 with a fluid tube 106 forming a plurality of heat-transfer coils 108 running therethrough. The housing 104 is operatively attached to a fan 110. The fan 110 drives air (or other atmosphere) into an air inlet or atmosphere inlet (not shown) of the housing 104. The driven air or other fluid exits the housing 104 through an air outlet 114, which in the example is covered by a grating 116. The heat-transfer device 101 of FIG. 1 is one example of many possibilities known in the art; other examples include fan coils, variable air ventilation boxes, radiant ceilings, radiant walls, radiant floors, and chilled beams.

The heat-transfer device 101 receives heat-transfer fluid (as described above) for providing or receiving heat through a inlet conduit 119 in the form of an inlet tube 120. The heat-transfer fluid passes through the plurality of heat-transfer coils 108 and exits the housing 104 of the heat-transfer device 101 though an outlet conduit 117 in the form of an outlet tube 118.

An electronic control valve 126 with a control cable 127 may be provided to control flow of heat-transfer fluid through the heat-transfer device 101. The electronic control valve 126 may receive signals through the control cable 127 to control the flow of heat-transfer fluid in the manner of a thermostat and/or based on other factors. The electronic control valve 126 is connected to the neighboring components by a fitting—for example, by the valve body 128 of the control valve 126. The electronic control valve 126 is a standard component in the art.

In certain heat-transfer systems, it is common for more than one heat-transfer device 101 and/or other heat-transfer devices to be installed in combination. For example, a plurality of the heat-transfer devices 101 may be installed in parallel, receiving heat-transfer fluid from a common source, which may take the form of a fluid-flowing device. Referring to FIGS. 1-14, in a system employing a plurality of heat-transfer devices 101, each heat-transfer device 101 may be equipped with a balancing valve 500. An isolation valve 600 may be operatively disposed in a fluid path such as piping or tubing between a source (not shown) of heat-transfer fluid and the heat-transfer device 101 or other heat-transfer device. The valve 600 may incorporate a return 603 and a port 800. A balancing valve 500 be used to control the relative resistance to flow through the operatively connected heat-transfer devices, thus controlling the relative flow of heat-transfer fluid, and thus the relative heat transfer, through each such heat-transfer device. A balancing valve may take the form of any known type of valve for controlling fluid flow, including but not limited to the balancing valve 500. Regardless of the type of balancing valve used, disclosed herein are embodiments of a device for joining the balancing valve to the heat-transfer device 101, or to another fluid-based heat-transfer device.

The heat-transfer device 101 has two main fluid connections: a device 300 connecting an upstream-fluid conduit 102 (FIG. 1) of heat-transfer fluid in fluid communication with an inlet conduit 119 (inlet tube 120), as in FIGS. 1 and 8-13; and a device 200 connecting a sink in the form of a conduit 103 (FIG. 1), which may be a return, outlet, reservoir, or the like, for heat-transfer fluid in fluid communication with an outlet conduit such as outlet conduit 117 (outlet tube 118), as in FIGS. 2-7.

Referring now to FIGS. 1 and 8-14, in one embodiment, a kit including a device 300 is disclosed for connecting an upstream-fluid conduit to a downstream-fluid conduit in fluid communication with a fluid-based heat-transfer device 101. With respect to the device 300, the upstream-fluid conduit 102 may comprise the source of heat-transfer fluid and may comprise an upstream tailpiece such as a tailpiece 142 connected to the heat-transfer device 101. The downstream-fluid conduit may comprise a downstream tailpiece such as a tailpiece 122 and/or the inlet conduit 119 in the form of the inlet tube 120. As noted above, "upstream" and "downstream" refer to the position of an upstream-fluid conduit or a downstream-fluid conduit with respect to the device 300; "upstream" and "downstream" do not refer to the location of elements with respect to the heat-transfer device 101. As a result, the device 300 includes a hose 302 as shown on the inlet (lower) side of the heat-transfer device 101 and connects to both an upstream-fluid conduit including a valve 600 and a tailpiece 142, and a downstream-fluid conduit including a port body 220 and an inlet conduit 119 in the form of an inlet tube 120. Similarly, a device 200 includes a hose 202 is shown on the outlet (upper) side of the heat-transfer device 101 and connects to both an upstream-fluid conduit including an outlet conduit 117 in the form of an outlet tube 18, and a downstream-fluid conduit including a downstream tailpiece 162 in fluid communication with the conduit 103 or return, with intervening elements (a fitting such as a valve body 128, a valve 500, a further downstream tailpiece 172) connected between the tailpiece 162 and the conduit 103.

The kit may be assembled to form a system 100 or portion thereof containing components disclosed herein and connecting an upstream-fluid conduit to a downstream-fluid conduit in fluid communication with a fluid-based heat-transfer device. The kit or elements thereof may also be used to practice a method for connecting an upstream-fluid conduit to a downstream-fluid conduit in fluid communication with a fluid-based heat-transfer device by assembling the kit elements described below, and/or by performing further steps as described below.

Referring to FIGS. 1-7 and 14, one example of such a kit or system includes device 200 including a hose 202, which may be formed from any suitable material—for example, corrugated rubber covered with braided stainless steel or other braided material. It is generally desirable for the hose 202 to be flexible in order to allow for some relative moment of the system elements, and to help to reduce the transmission of vibrations from one system element to another. The hose 202 may alternatively be formed from other metal or other material suitable to the application as known in the art. The hose 202 includes a first hose end 204, a second hose end 206, and a hose bore 208 (FIGS. 4-7). The device 200 further includes a first-port body 220 having an first-exterior wall 222 with a protrusion 260 protruding exteriorly therefrom, a first-port-body-hose end 224 with a first-port-body-hose opening 228, a first-port-body-connector end 226 with a first-port-body-connector opening 230, a first-port-body bore 232 extending between the first-port-body-hose opening 228 and the first-port-body-connector opening 230, and a first-port aperture 238 passing through the first-exterior wall 222 and in fluid communication with the first-port-body bore 232, with the first-port-body-hose opening 228 being sealingly, non-rotatably, and non-removably joined to the first hose end 204, with the first-port-body bore 232 in fluid communication with the hose bore 208. The illustrated embodiment includes a protrusion 260 encircling the first-port-body-connector opening 230. The protrusion 260 is configured to capture first connector nut 250 (discussed below), such that the first connector nut is retained in position about, but is free to rotate around, hose bore 208.

The first-port-body-hose end 224 is affixed to the first hose end 204. In the illustrated embodiment, the first-port-body-hose end 224 and the hose 202 are affixed using a collar 205 which is welded to and therefore made integral with both the first-port-body-hose end 224 of the first-port body 220 and to the first hose end 204. A collar of the same general type as collar 205 may be used for any sealing, non-rotatable, and/or non-removable connection in any embodiment disclosed herein. Alternatively, connection may be accomplished by intervening elements mutually connected in order to make a connection that is not intended to be removed in ordinary use.

Figure 5:
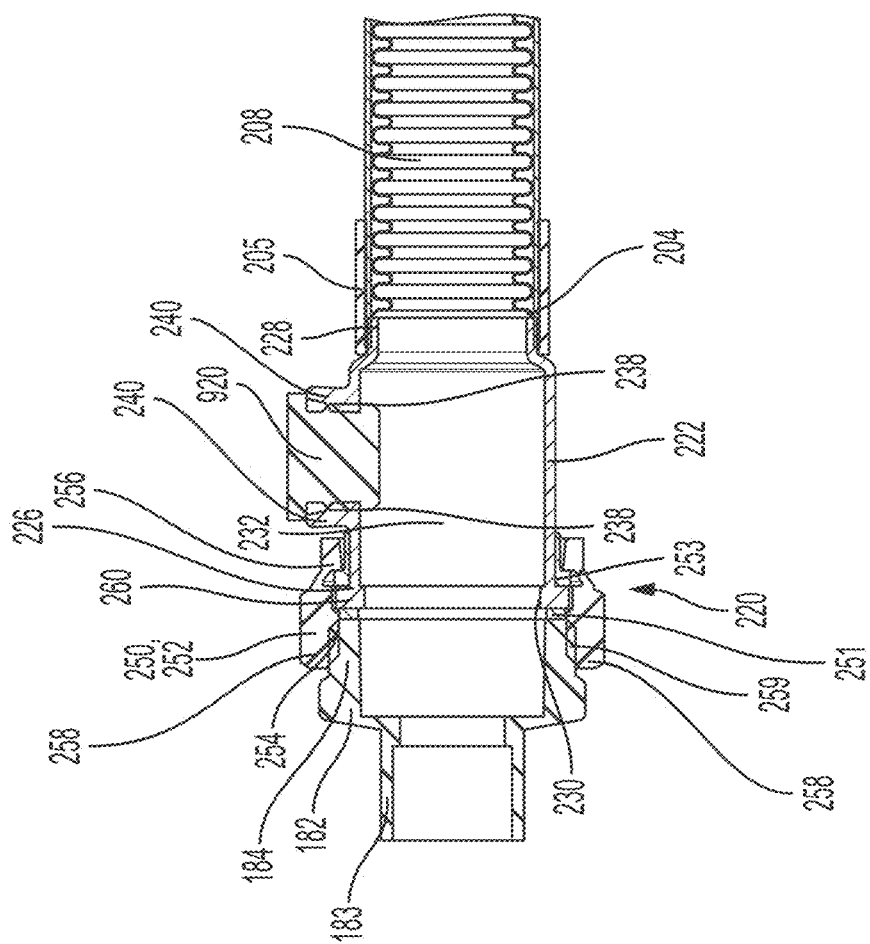
FIG. 5 is a magnified partial view of a leftmost portion of the view of FIG. 4.
Figure 6:
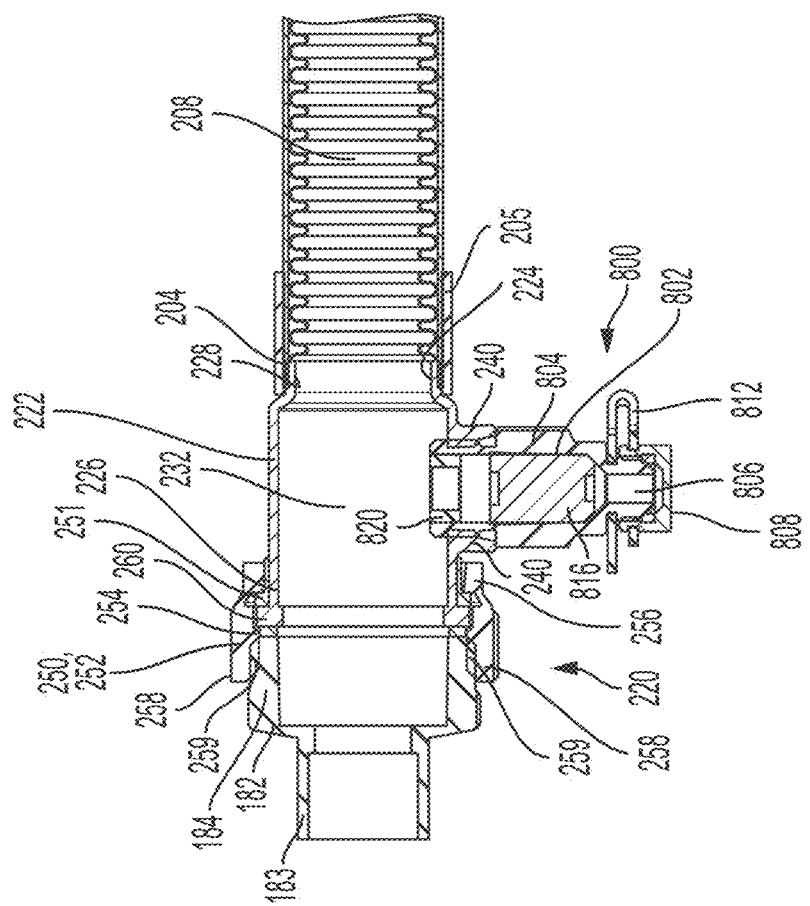
FIG. 6 is a top plan, cross-sectional, schematic, detail view of the leftmost portion of the outlet assembly of FIG. 1.

Referring to FIGS. 5 and 6, the first connector nut 250 is captured upon the first port-body-connector end 226. The first connector nut 250 has a rotatable body 252 with a rotating-body central aperture 254 passing therethrough. The rotatable body 252 has a first rotating-body end 256 and a second rotating-body end 258. The first rotating-body end 256 is captured on the first-port-body-connector end 226 and is configured to form a sealing connection between the first rotating-body end 256, the rotating-body central aperture 254, and the first-port-body-connector end 226.

An upstream tailpiece 182 has a conduit end 183 configured to be sealingly connectable to the upstream-fluid conduit in the form of outlet conduit 117 or outlet tube 118. The upstream tailpiece 182 has a connector end 184; the connector end 184 may be removably and directly connectable the first connector nut 250.

The first connector nut 250 may include or be used with sealing elements to aid in forming the sealing connection. For example, a sealing ring 251 may be disposed on the port-body-connector end 226, located radially inwardly from the rotatable body 252 to form a seal between the first-port-body-connector end 226 and the upstream tailpiece 182 in use. Optionally, an isolation collar 253, which may have a stepped outer surface or an L-shaped cross section (FIG. 12), may be disposed between the protrusion 260 and the first rotating-body end 256 for galvanic isolation.

As shown in the embodiment of FIGS. 1-7, the kit, system, or method may further include, in the device 200, a second-port body 1220, which may be sealingly, non-rotatably, and/or non-removably joined to the second hose end 206 in fluid communication with the hose bore 208. Thus the device 200 may have a port body disposed at each end thereof, each secured in a comparable manner. The first-port body 220 (which may be referenced as simply a "port body" when the second-port body is not mentioned) and the second-port body 1220 may be substantially identical, forming (together with the hose 202) a version of the device 200 with a port body and a connector nut at each end thereof.

In the kit, device, and method disclosed, the second-port body 1220 may have the same or similar elements as the first-port body 220 and may be connected in the same manner as the first-port body 220. For example, in the illustrated embodiment, the second-port body 1220 has a second-exterior wall 1222, a second-port-body-hose opening 1230, a second-port-body-connector opening 1232, a second-port-body bore 1234 extending between the second-port-body-hose opening 1230 and the second-port-body-connector opening 1232, and a second-port aperture 1238 passing through the second-exterior wall 1222 in fluid communication with the second-port-body bore 1234, with the second-port-body-hose opening 1230 being sealingly, non-rotatably, and non-removably joined to the second hose end 206, with the second-port-body bore 1234 in fluid communication with the hose bore 208.

A second connector nut 1250 is joined and may be joined directly to the second-port body 1220 at the second second-port-body end 1228. The second connector nut 1250 has a second rotatable body 1252 with a second rotatable-body central aperture 1254 passing therethrough. The second rotatable body 1252 has a first second-rotatable-body end 1256 and a second second-rotatable-body end 1258. The first second-rotatable-body end 1256 of the second rotatable body 1252 is rotatably coupled to the second second-port-body end 1228 and is configured to form a sealing connection between the first second-rotatable-body end 1256, the second rotatable-body central aperture 1254, and the second second-rotatable-body end 1258. The second second-rotatable-body end 1258 of the second rotatable body 1252 is configured to engage a second fluid connector such as a downstream tailpiece 162.

In a kit according to the illustrated embodiment, the downstream tailpiece 162 has a conduit end 163 sealingly connected to the downstream-fluid conduit 103 through intervening elements—the valve body 128, the downstream tailpiece 162, the balancing valve 500, and the further downstream tailpiece 172 as noted above; alternatively the connection to the downstream-fluid conduit may be direct, as in the device 300 (discussed below). The downstream tailpiece 162 has a connector end 163 removably and directly connectable to the second connector nut 1250. The second connector nut 1250 is connectable to a downstream tailpiece 162. The downstream tailpiece 162 has a conduit end 164 configured to be sealingly and directly connected to the downstream-fluid conduit, which in the illustrated embodiment includes the valve 500, the tailpieces 162, and the conduit 103 connected thereto. Sealing connection may be facilitated by a sealing ring 251 and/or a sealing collar 253, which are as described above with respect to the first connector nut 250.

Each second-port aperture 1238 and/or each second-port-aperture wall 1240 may include threads or other mechanisms for sealingly engaging a pressure-temperature port such as the pressure-temperature port 800 (shown in detail in FIG. 14), a bleeder valve 900, or another device requiring access to the heat-transfer fluid flowing through the system, or to a flow path thereof.

In any embodiment of the disclosed kit, device, or method the second rotatable body 1252 may have a first state wherein the second rotatable body 1252 is rotatable with respect to the second-exterior wall 1222, and a second state wherein the second rotatable body 1252 is fixed with respect to the second-exterior wall 1222.

In any embodiment of the disclosed kit, device, or method, the second-exterior wall 1222 may have a second protrusion 1260 protruding exteriorly therefrom, and the second protrusion 1260 may be configured to engage the second rotatable body 1252 to limit an axial movement thereof.

In any embodiment of the disclosed kit, device, or method, the second protrusion 1260 and the second rotatable body 1252 may be configured to engage to cause the second rotatable body 1252 to be locked against rotation with respect to the second-exterior wall 1222.

In any embodiment of the disclosed kit, device, or method, the second-port aperture 1238 may be surrounded by a second-port-aperture wall 1240, and the second-port-aperture wall 1240 may protrude from the second-exterior wall 1222.

Figure 4:
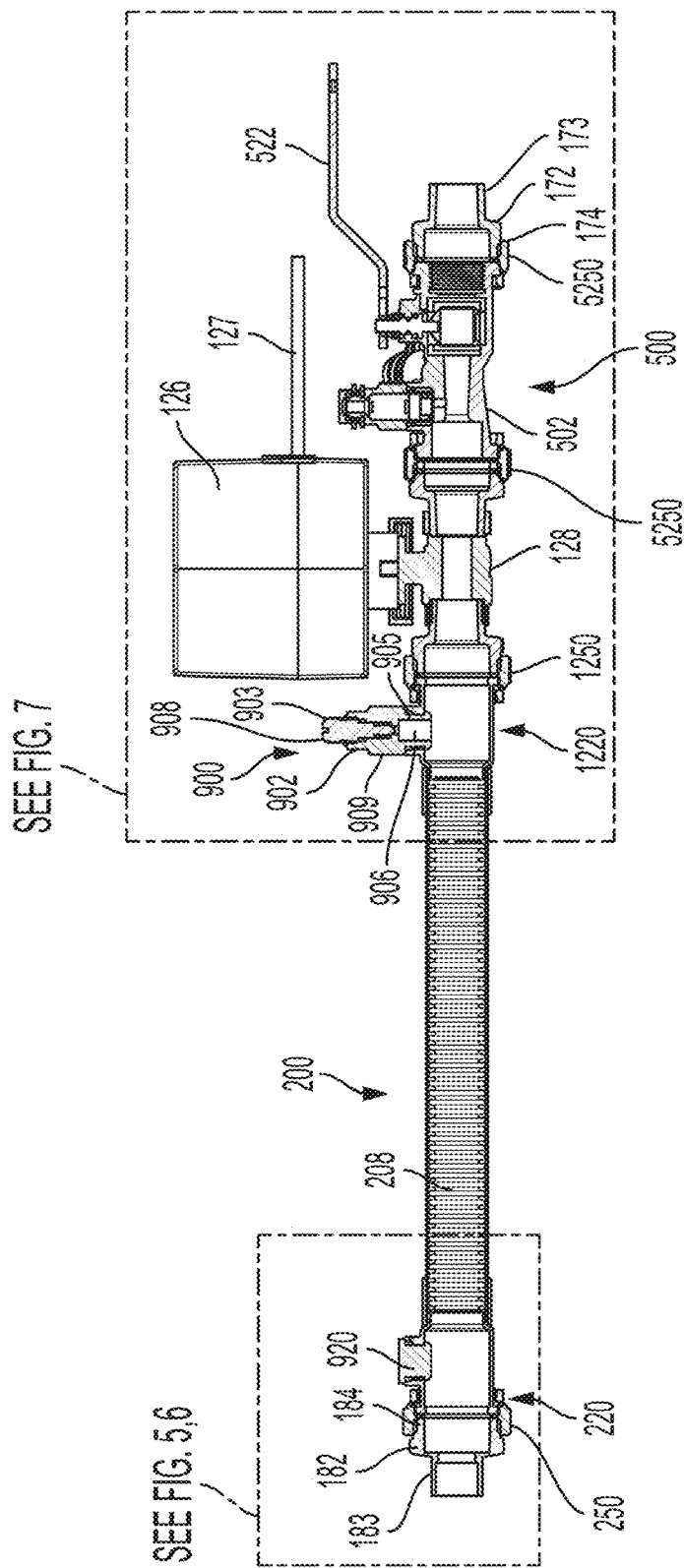
FIG. 4 is a side elevational, cross-sectional, schematic view of the outlet assembly of FIG. 1.
Figure 7:
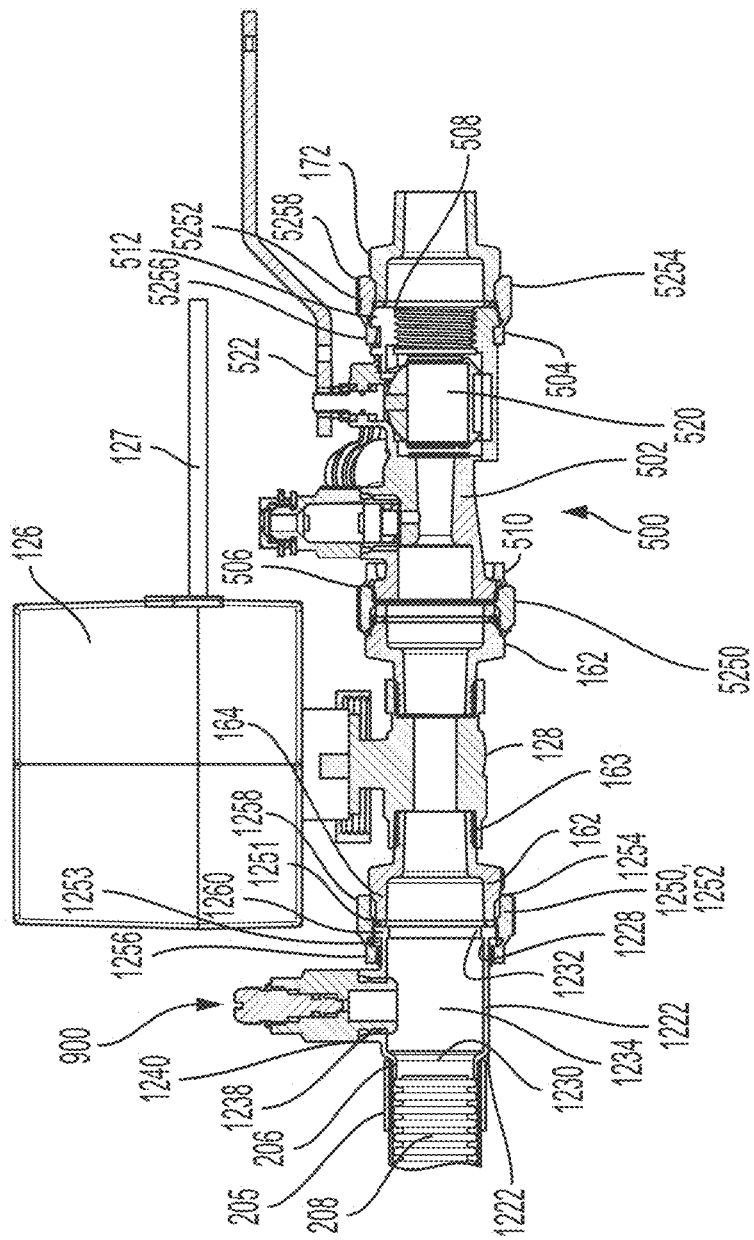
FIG. 7 is a detail view of a rightmost portion of the view of FIG. 4.
Figure 8:
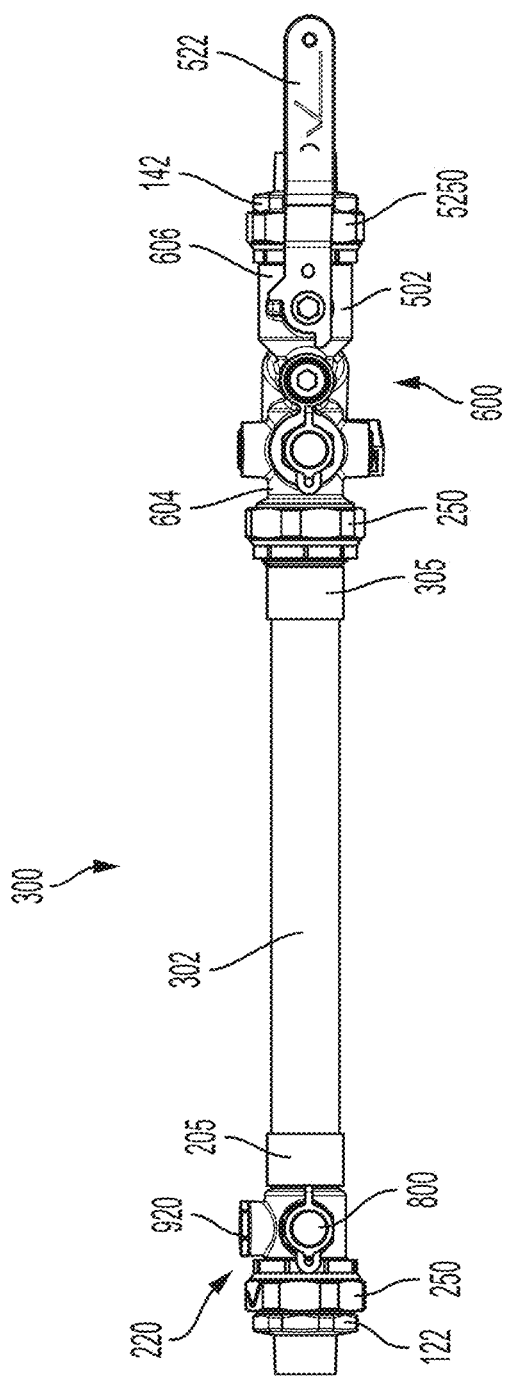
FIG. 8 is a top plan schematic view of an inlet assembly of the heat-transfer device of FIG. 1.
Figure 9:
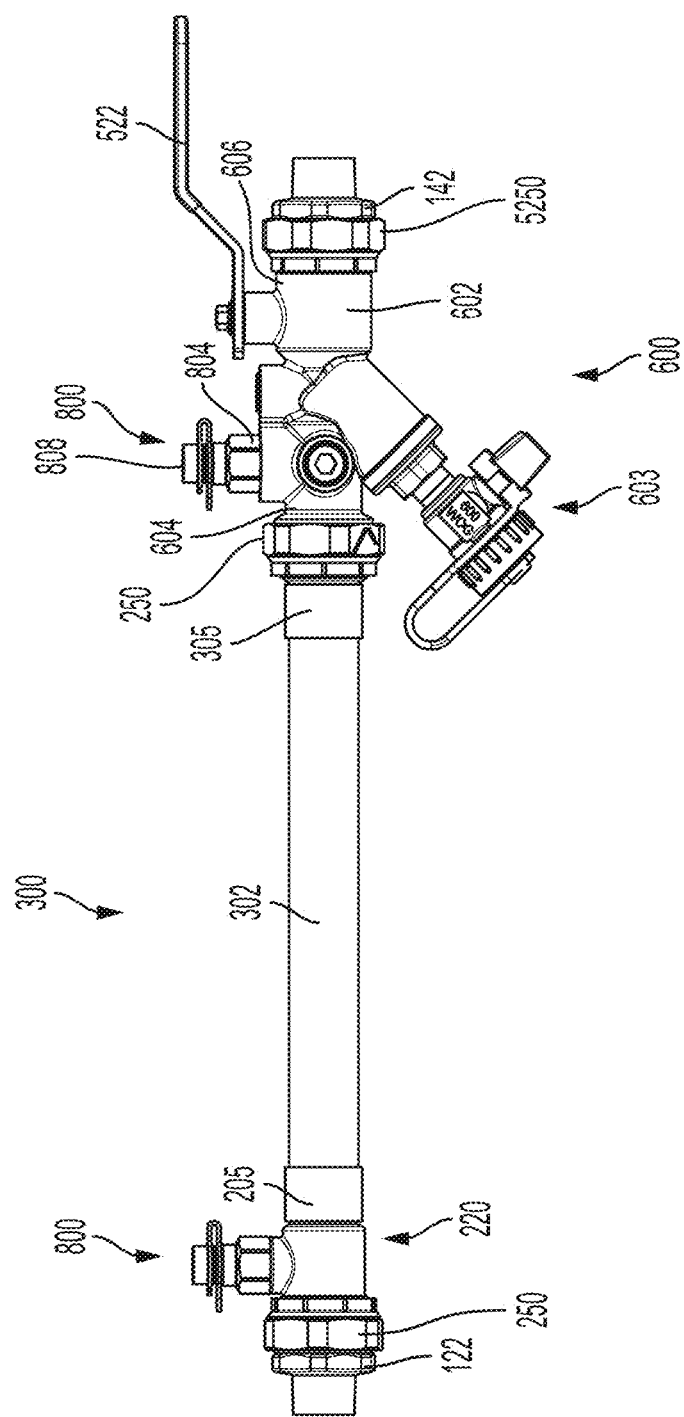
FIG. 9 is a side elevational schematic view of the inlet assembly of FIG. 8.
Figure 10:
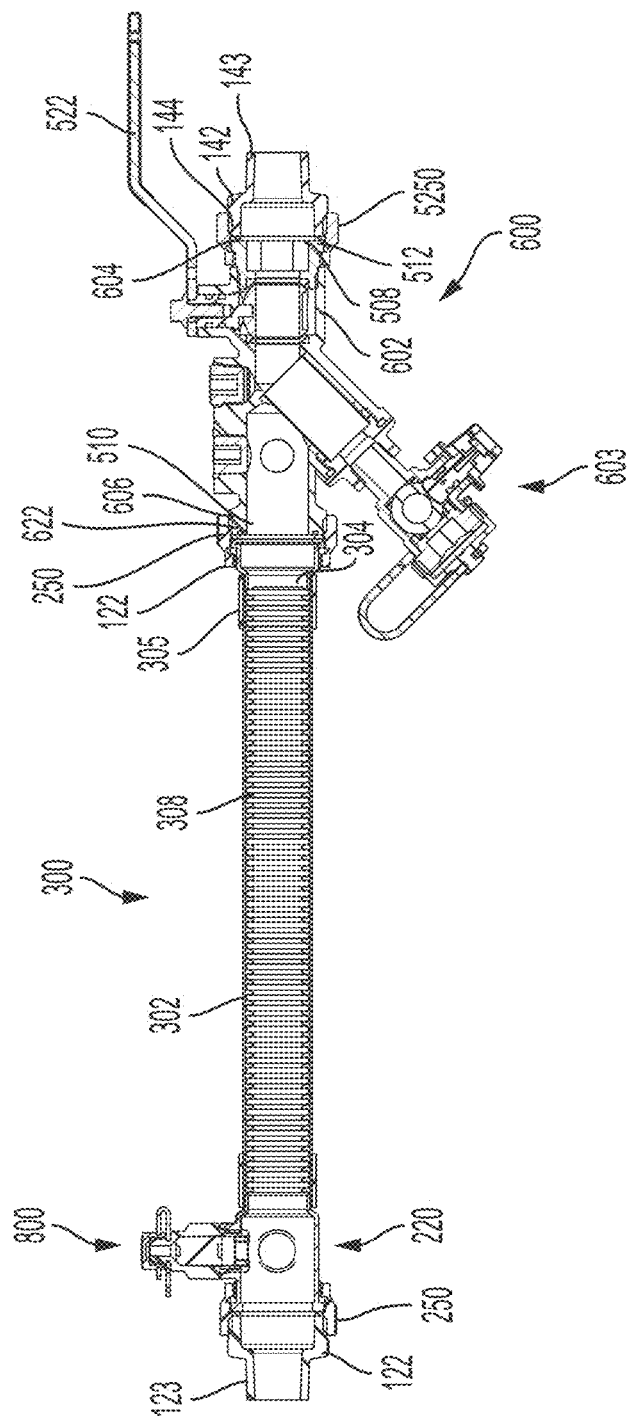
FIG. 10 is a side elevational, cross-sectional, schematic view of the inlet assembly of FIG. 8.
Figure 11:
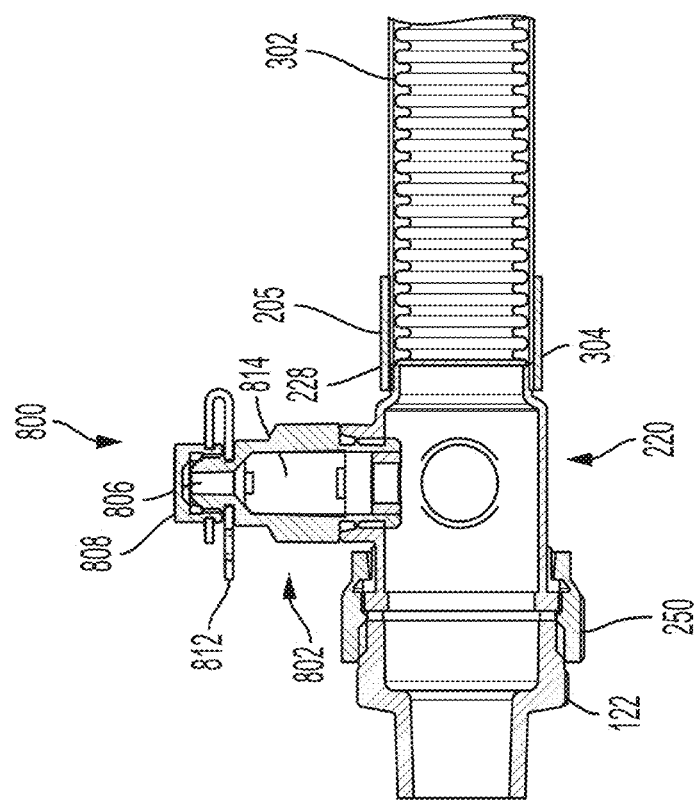
FIG. 11 is a detail view of a leftmost portion of the view of FIG. 10.

Referring to FIGS. 4 and 7, a downstream tailpiece 162 has a conduit end 163 configured to be sealingly connectable to the downstream-fluid conduit in the form of the conduit 103 and having a connector end 164 removably and directly connectable to the second connector nut 5250.

In the kit, system, and method disclosed herein, the upstream tailpiece 182 is configured to be removably and directly connectable to the second connector nut 1250 as well as to the first connector nut 250, and the downstream tailpiece 162 is configured to be removably and directly connectable to the first connector nut 250 as well as to the second connector nut 1250. As a result, after the device 200 is assembled into the configuration disclosed above, the first connector nut 250 and the second connector nut 1250 may be loosened, and the orientation of the upstream and downstream ends of the device 200 may be reversed. Reversing of the orientation may be accomplished by disengaging the first connector nut 250 from the upstream tailpiece 182 and disengaging the second connector nut 5250 from the downstream tailpiece 162; re-orienting the connection device 200; and re-engaging the connection device 200 with the with the connector end 184 of the upstream tailpiece 182 and the connector end 164 of the downstream tailpiece 162 by tightening the first connector nut 250 with respect to the downstream tailpiece 162 (as opposed to the original connection to the upstream tailpiece 182) and tightening the second connector nut 5250 with respect to the upstream tailpiece 182 (as opposed to the downstream tailpiece 162).

In any embodiment of the disclosed kit, system, or method, the rotatable body 252 (and thus the first connector nut 250) may have two states that correspond to a loose state and a tightened/locked state. For example, the rotatable body 252 may have a first state wherein the rotatable body 252 is rotatable with respect to the exterior wall 222 of the port body 220, and a second state wherein the rotatable body 252 is fixed with respect to the exterior wall 222 of the port body 220. The second state may provide for fixing of an orientation of the exterior wall 222 with respect to a tailpiece (such as the tailpiece downstream tailpiece 122) for connection to the fluid-based heat-transfer device 101. The first state and the second state may be the result of loosening and tightening, respectively, a threaded connection 259 (illustrated as overlap between adjacent elements) directly between the rotatable body 252 and the tailpiece 122, drawing the rotatable body 252 axially, resulting in a frictional locking effect between the rotatable body 252 and the exterior wall 222. In use, the port body 220 may be rotated to a desired orientation before being locked in place by way of tightening the first connector nut 250 with respect to the tailpiece 122. The procedure for locking the port body 220 in the desired orientation is simpler and more convenient than orienting an aperture for a port using a plurality of conventional fittings. The port body 220 may provide the advantage that a port may be located immediately adjacent to the heat-transfer device 101 rather than on the valve end of a hose 202 or a hose 302, with convenience control of the orientation of the port.

In any embodiment of the disclosed kit, device, or method, the frictional locking effect between the rotatable body 252 of the first connector nut 250 and the tailpiece 122 may be facilitated by the exterior wall 222 having the protrusion 260 protruding exteriorly therefrom. The protrusion 260 may be configured to capture the rotatable body 252. In some embodiments, a tailpiece such as the tailpiece 122 may have an external fitting such as a hex fitting engageable with a wrench or other drive mechanism, and a connector nut such as the first connector nut 250, and in particular the rotatable body 252 thereof, may also have an external fitting such as a hex fitting engageable with a wrench or other drive or holding mechanism, so that the tailpiece and the connector nut can be mutually tightened using a wrench, powered wrench, or other suitable tool to engage the external fitting of each.

In any embodiment of the disclosed kit, device, or method, the protrusion 260 and the rotatable body 252 may be configured (as by the threaded connection 259 or other known connections) to engage to cause the rotatable body 252 of the connector nut to be locked against rotation with respect to the exterior wall 222. The rotatable body 252 may be urged into contact with the protrusion 260 by tightening of the threaded connection 259, so that friction between the rotatable body 252 and the protrusion 260 prevents relative movement thereof.

In any embodiment of the disclosed kit, device, or method, the first port aperture 238 may be surrounded by a port-aperture wall 240, and the port-aperture wall 240 may protrude from the exterior wall 222. In some embodiments, including the illustrated embodiments, the exterior wall 222 may include one, two, three, or more port apertures 238. Each port aperture 238 may be surrounded by a port-aperture wall 240 extending radially from the exterior wall 222. The port aperture(s) and/or the port-aperture wall(s) 240 may include threads or other mechanisms for sealingly engaging (including in conjunction with scaling tape, sealant, or other elements) a pressure-temperature port such as a pressure-temperature port 800 (shown in detail in FIG. 14), a bleeder valve 900, or another device requiring access to the heat-transfer fluid flowing through the system or a fluid path thereof.

In any embodiment of the disclosed kit, device, or method, referring particularly to FIG. 7, a valve such as a balancing valve 500 may be provided for joining to a fluid connector such as a tailpiece 162 or a tailpiece 142 in the device 200, or to one of the other tailpieces disclosed herein. In the referenced figures, the balancing valve 500 includes a valve body 502 having a first valve-body end 504, a second valve-body end 506, a first-valve-body opening 508, and a second-valve-body opening 510 in fluid communication with the first-valve-body opening 508. A flow-control element 520, which may be any valve element for regulating fluid flow, such as a ball, a clapper, or another closure mechanism as known in the art of valves, is configured to selectably control flow between the first-valve-body opening 508 and the second-valve-body opening 510. A flow-control selector 522 in the form of a handle is operatively connected to the flow-control element 520. A third connector nut 5250 is joined and may be joined directly to the first valve-body end 504, the connector nut 5250 having a rotatable body 5252 with a rotating-body central aperture 5254 passing therethrough. The rotatable body 5252 has a first rotatable-body end 5256 and a second rotatable-body end 5258. The first rotatable-body end 5256 is rotatably coupled to the first valve-body end 504 and is configured to form a sealing connection between the first rotatable-body end 5256, the rotating-body central aperture 5254, and the second rotatable-body end 5258. The second rotatable-body end 5258 is configured to engage a fluid connector such as the downstream tailpiece 172; in the illustrated embodiment, the tailpiece 172 is a downstream tailpiece when the valve 500 is considered as part of the device 200 under discussion.

In any embodiment of a valve as disclosed herein, as in the valve 500, the valve may include a fourth connector nut 5250 rotatably and non-removably coupled to the second valve-body end 506.

In any embodiment of a valve as disclosed herein, any rotatable body 5252 may have a first state wherein the rotatable body 5252 is rotatable with respect to the valve body 502, and a second state wherein the rotatable body 5252 is fixed with respect to the valve body 502.

In any embodiment of a valve as disclosed herein, the valve body 502 may have a protrusion 512 (or a second such protrusion) protruding exteriorly therefrom, and the protrusion 512 may be configured to engage the rotatable body 5252 to limit an axial movement thereof.

In any embodiment of a valve as disclosed herein, the protrusion 512 and the rotatable body 5252 may be configured to engage to cause the rotatable body 5252 to be locked against rotation with respect to the valve body 502.

The balancing valve 500 thus may be provided with a connector nut 5250 coupled thereto and/or coupled directly thereto for connection to the conduit 103 by way of the downstream tailpiece 172. The downstream tailpiece 172 may include an external fitting such as a hex fitting compatible with a wrench such as a power wrench or impact wrench. The downstream tailpiece 172 thus may allow for tightening by way of an impact wrench or other power tool. The downstream tailpiece 172 may aid rapid installation of the balancing valve 500, reducing or eliminating the need for additional fittings to connect the balancing valve 500 to the conduit 103 of the heat-transfer system 100.

Figure 14:
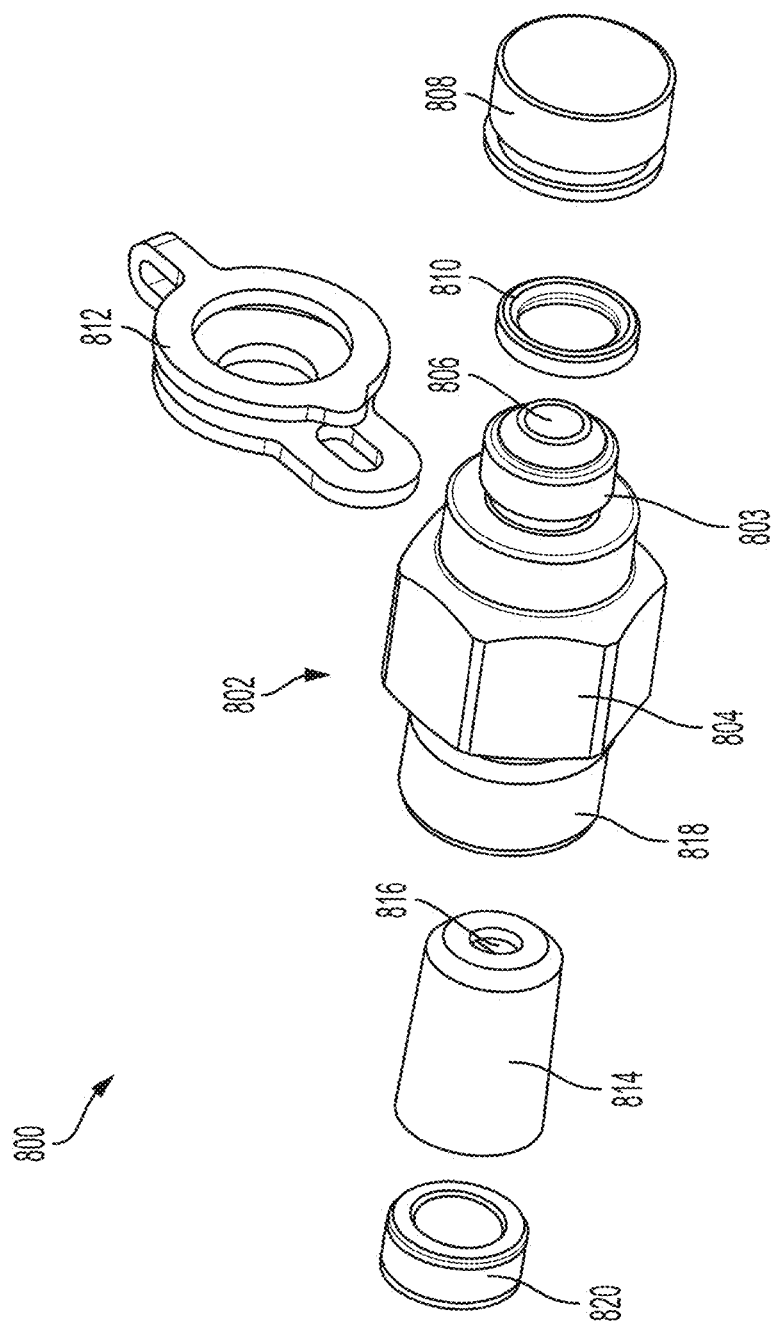
FIG. 14 is an exploded view of a pressure-temperature probe for use with the heat-transfer device of FIGS. 1-13.

The first port aperture 238 and second-port aperture 1238, and the associated port-aperture wall 240 and second-portaperture wall 1240, provide a mechanism for attaching devices to access the heat-transfer fluid and the fluid path thereof, such as the pressure-temperature port 800 (shown in detail in FIG. 14), the bleeder valve 900, a plug 920, or another device requiring access to the heat-transfer fluid flowing through the system. Referring to FIG. 6 and FIG. 14, the pressure-temperature port 800 ("PT port") includes a PT body 802 configured to sealingly connect to the first port aperture 238 and second-port aperture 1238. The PT body 802 has an external fitting 804, which may be a hex or other fitting compatible with one or more wrenches, sockets, or the like. The PT body 802 has an aperture 806 that extends axially through the PT body 802 from a proximal end 803 to a distal end 805 thereof. The distal end 805 includes a threaded portion 818 (the threads are not individually shown) for sealingly engaging the first port aperture 238, the second-port aperture 1238, the port-aperture wall 240, or the second-port-aperture wall 1240. A PT cap 808 seals the aperture 806 and may include as O-ring seal 810. A PT tether 812 is attached to the PT cap 808 to prevent the PT cap 808 from being dropped or lost when removed from the PT body 802. The PT body 802 contains a PT seal 814, which is generally cylindrical and includes a PT probe aperture 816 for admitting a probe—for example, a pressure or temperature probe—to extend therethrough to access the heat-transfer fluid or the path thereof through the PT body 802. A retainer ring 820 is fitted under compression, such as in a force fit, into the aperture 806 to retain the PT seal 814 in place.

Alternatively, referring to FIGS. 1, 4, and 7, a bleeder valve 900 may be provided for releasing fluid (typically gaseous fluid such as air) from the heat-transfer device 101 and may be configured to sealingly connect to the first port aperture 238 and second-port aperture 1238. The bleeder valve 900 has bleeder body 902 and an external fitting 904, which may be a hex or other fitting compatible with one or more wrenches, sockets, or the like. The bleeder valve 900 has an aperture 906 that extends axially through the bleeder body 902 from a proximal end 903 to a distal end 905 thereof. A threaded stem 908 seals and unseals the aperture and may include additional sealing elements (not shown).

In use, the device 200 allows each port body (the first-port body 220 or the second-port body 1220) to be oriented as desired, without constraints imposed by the use of fixed threads or other fixed-orientation connectors. Selecting the orientation can be advantageous in providing for convenient access to a pressure-temperature port 800 that might need to be angled to avoid clutter in a surrounding building space, or for providing an upward position or orientation for a bleeder valve 900, so that air or other trapped gases can be released from the heat-transfer system 100. If a port body 220 includes one or more port apertures 238 that are not occupied by a pressure-temperature port 800 or a bleeder valve 900, then each unoccupied port aperture 238 may be sealed with a plug 920, as shown in, for example, FIG. 1 and FIGS. 3-5.

Referring now to FIGS. 8-13, in contrast to the device 200, which includes both the port body 220 and the port body 1220, the device 300 includes a single port body 220 connected to a hose 302 by a collar 205. The components of the port body 220 of FIG. 12 and related connections may be substantially identical to those of FIG. 5 (discussed above).

Figure 12:
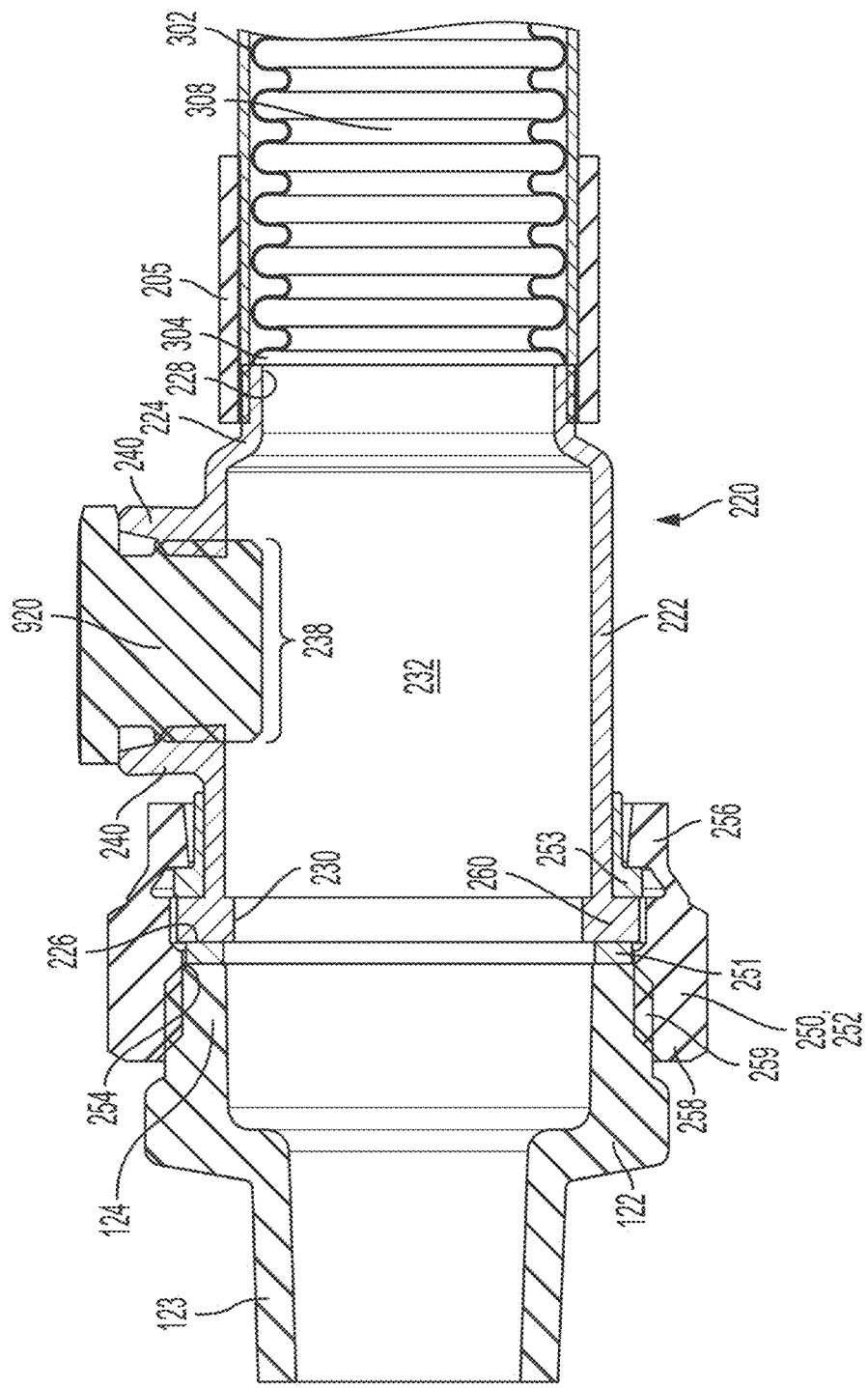
FIG. 12 is a top plan, cross-sectional, schematic, detail view of the leftmost portion of the inlet assembly of FIG. 8.

Referring particularly to FIG. 12, the hose 302 may by formed in substantially the same manner as the hose 202 described above. The hose 302 includes a first hose end 304, a second hose end 306, and a hose bore 308 (FIGS. 10-13). The device 300 further includes a port body 220 as discussed above and denoted the "first port body 220" in the discussion above.

The first connector nut 250 attached to the port body 220 is configured is described above. The first connector nut 250 has a rotatable body 252 with a rotating-body central aperture 254 passing therethrough. The rotatable body 252 has a first rotating-body end 256 and a second rotating-body end 258. The first rotating-body end 256 is rotatably coupled to the first-port-body-connector end 226 and is configured to form a sealing connection between the first rotating-body end 256, the rotating-body central aperture 254, and the first-port-body-connector end 226.

Figure 13:
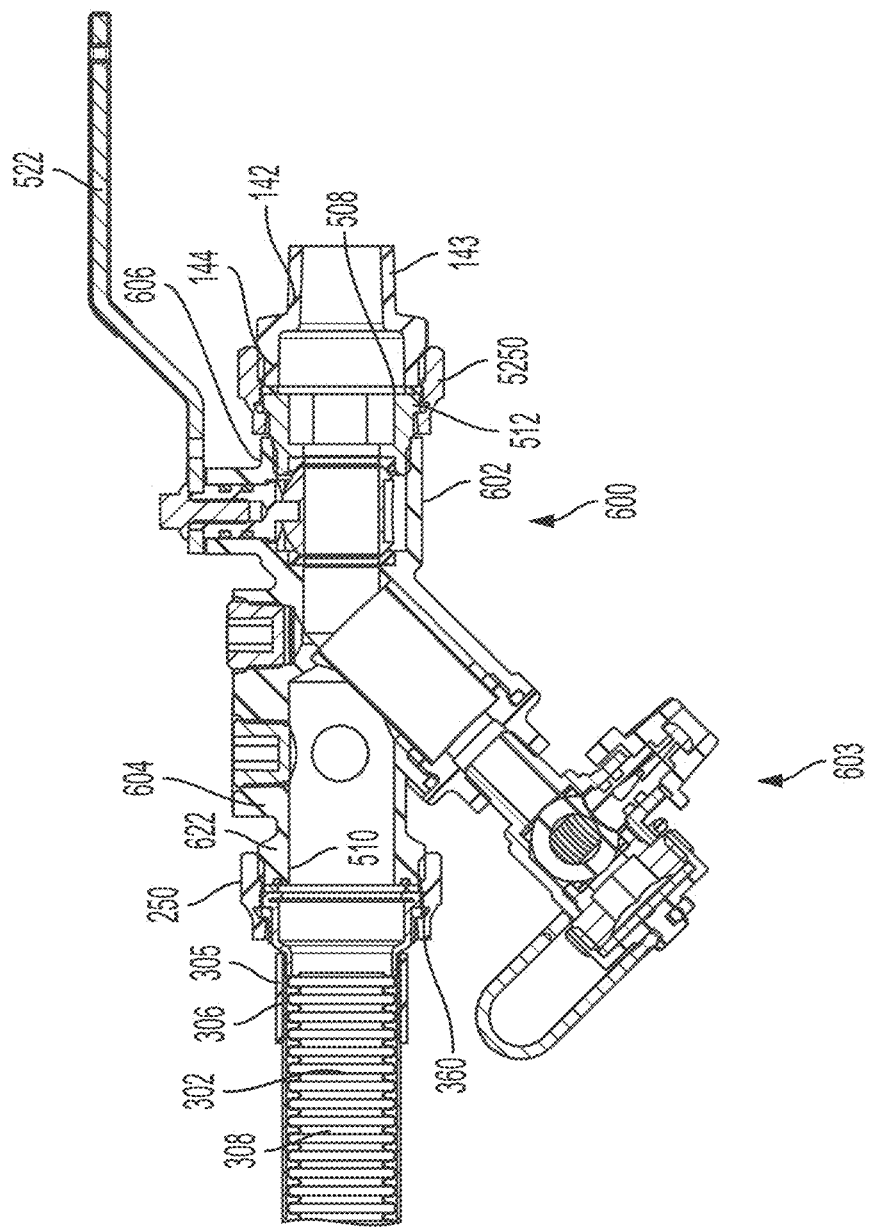
FIG. 13 is a detail view of a rightmost portion of the view of FIG. 10.

Referring to FIG. 13, on the right end of the hose 302 as shown, rather than a second port housing, the device 300 includes a second connector nut 250 rotatably and non-removably coupled to the hose 302, rather than to a port body, via a collar fitting 305 that may comprise one or more components that are affixed in a fluid-tight manner to hose 302, by welding or other means known in the art. The second connector nut 250 shares the configuration of the other connector nuts 250 described herein but is engaged with the collar fitting 305 rather than with a port body or a valve body. In the illustrated embodiment, the collar fitting 305 includes a protrusion 360 encircling the first hose end 306. The protrusion 360 is configured to capture the second connector nut 250.

In a kit, system, or method as disclosed herein and as shown in FIGS. 8-13, a downstream tailpiece 122 has a conduit end 123 configured to be sealingly connectable to the upstream-fluid conduit in the form of the inlet conduit 119 or the inlet tube 120. The tailpiece 122 has a connector end 124 removably and directly connectable the first connector nut 250 of the port body 220. An upstream tailpiece 142 may have a connector end 144 and a conduit end 143 configured to engage the upstream-fluid conduit 102 directly (FIG. 1) in an embodiment wherein the valve 600 is omitted, with the second connector nut 250 of the hose 302 directly engaging the upstream tailpiece 142. Alternatively, a valve 600 may be included and may have a valve body 602 with a first valve-body end 604 and a second valve-body end 606. The first valve-body end 604 has a first-valve-body opening 608, and the second valve-body end 606 has a second-valve-body opening 610. A flow-control element (not shown), which may be any valve element for regulating fluid flow, such as a ball, a clapper, or another closure mechanism as known in the art of valves, is configured to selectably control flow between the first-valve-body opening 608 and the second-valve-body opening 610. A flow-control selector 522 in the form of a handle is operatively connected to the flow-control element. The connector nut 250 of the hose 302 is joined and may be joined directly to the first valve-body end 604 by way of an upstream tailpiece in the form of either a fixed fitting 622 of the valve 600 or an upstream tailpiece 142, which may engage the connector nut 250 directly where the valve 600 is omitted. The upstream tailpiece has a conduit end 143 configured to engage the upstream-fluid conduit 102. In the illustrated embodiment, the fixed fitting 622 is an upstream tailpiece when the valve 500 is considered as part of the device 300 under discussion.

An example of a method is provided for connecting an upstream-fluid conduit 102 to a downstream-fluid conduit in the form of a inlet conduit 119 or an inlet tube 120 in fluid communication with a fluid-based heat-transfer device 101. The method comprises sealingly connecting an upstream tailpiece 142 or fixed fitting 622 at a conduit end 143 thereof to the upstream-fluid conduit 102, the upstream tailpiece 142 or the fixed fitting 622 having a connector end 143 removably and directly connectable to a first connector nut 250. The method also includes sealingly connecting a downstream tailpiece 122 at a conduit end 123 thereof to the downstream-fluid conduit in the form of the inlet conduit 119 or the inlet tube 120. The downstream tailpiece 122 also has a connector end 124 removably and directly connectable to a second connector nut 250. The method includes engaging a connection device 300 with the connector end 143 of the upstream tailpiece 142 and the connector end 124 of the downstream tailpiece 122. The connection device 300 comprises: a hose 302 comprising a first hose end 304 and a second hose end 306 and a hose bore 308. The connection device 300 also comprises a port body 220 having an exterior wall 222, a port-body-hose end 224 with a port-body-hose opening 228, a port-body-connector end 226 with a port-body-connector opening 230, a port-body bore 232 extending between the port-body-hose opening 228 and the port-body-connector opening 230, and a port aperture 238 passing through the exterior wall 222 an in fluid communication with the port-body bore 232, with the port-body-hose opening 228 being sealingly, non-rotatably, and non-removably joined to the first hose end 304, with the port-body bore 232 in fluid communication with the hose bore 308. The connection device 300 also includes a first connector nut 250 rotatably and non-removably coupled to the port-body-connector opening 230, and a second connector nut 250 rotatably and non-removably coupled to the second hose end 306. The upstream tailpiece 142 or the fixed fitting 622 is configured to be removably and directly connectable to the second connector nut 250, and the downstream tailpiece 122 is configured to be removably and directly connectable to the first connector nut 250. The engaging the connection device with the connector end 144 of the upstream tailpiece 142 or the fixed fitting 622 and with the connector end 164 of the downstream tailpiece 162 includes: tightening the first connector nut 250 with respect to the upstream tailpiece 142 or the fixed fitting 622; and tightening the second connector nut 250 with respect to the downstream tailpiece 162. The method may comprise, after completing foregoing method steps, disengaging the first connector nut 250 from the upstream tailpiece 142 or the fixed fitting 622; disengaging the second connector nut 250 from the downstream tailpiece 122; re-orienting the connection device 300 and re-engaging the connection device 300 with the with the connector end 144 of the upstream tailpiece 142 or the downstream tailpiece 162, and re-engaging the connector end 164 of the downstream tailpiece 162 by the following steps: tightening the first connector nut 250 with respect to the downstream tailpiece 162; and tightening the second connector nut 250 with respect to the upstream tailpiece 142 or the fixed fitting 622.

A further example of a method is provided for connecting an upstream-fluid conduit in the form of a outlet conduit 117 or an outlet tube 118 to a downstream-fluid conduit 103 in fluid communication with a fluid-based heat-transfer device 101. The method comprises: sealingly connecting an upstream tailpiece 182 at a conduit end 183 thereof to the upstream-fluid conduit in the form of the outlet conduit 117 or the outlet tube 118, the upstream tailpiece 182 having a connector end 184 removably and directly connectable to a first connector nut 250. The method also includes sealingly connecting a downstream tailpiece 162 at a conduit end 163 thereof to the downstream-fluid conduit 103, the downstream tailpiece 162 having a connector end 164 removably and directly connectable to a second connector nut 5250. The method includes engaging a connection device 200 with the connector end 184 of the upstream tailpiece 182, and engaging the connection device 200 with the connector end 164 of the downstream tailpiece 162 or the connector end 174 of the downstream tailpiece 172 (where the valve body 128 and the valve 500 are omitted). The connection device 200 comprises a hose 202 comprising a first hose end 204 and a second hose end 206 and a hose bore 208. The connection device 200 also comprises a first-port body 220 having a first-exterior wall 222, a first-port-body-hose opening 228, a first-port-body-connector opening 230, a first-port-body bore 232 extending between the first-port-body-hose opening 228 and the first-port-body-connector opening 230, and a first-port aperture 238 passing through the first-exterior wall 222 an in fluid communication with the first-port-body bore 232, with the first-port-body-hose opening 2280 being sealingly, non-rotatably, and non-removably joined to the first hose end 204, and with the first-port-body bore 232 in fluid communication with the hose bore 208. The connection device 200 also includes a first connector nut 250 rotatably and non-removably coupled to the first-port-body-connector opening 230. The connection device 200 also comprises a second-port body 1220 having a second-exterior wall 1222, a second-port-body-hose opening 1230, a second-port-body-connector opening 1232, a second-port-body bore 1234 extending between the second-port-body-hose opening 1230 and the second-port-body-connector opening 1232, and a second-port aperture 1238 passing through the second-exterior wall 1222 in in fluid communication with the second-port-body bore 1234, with the second-port-body-hose opening 1230 being sealingly, non-rotatably, and non-removably joined to the second hose end 206, with the second-port-body bore 1234 in fluid communication with the hose bore 208. The connection device 200 also comprises a second connector nut rotatably 1250 and non-removably coupled to the second hose end 206. The engaging the connection device 200 with the connector end 184 of the upstream tailpiece 182 and with the connector end 164 of the downstream tailpiece 162 or the connector end 174 of the downstream tailpiece 172 includes tightening the first connector nut 250 with respect to the upstream tailpiece 182; and tightening the second connector nut 1250 with respect to the downstream tailpiece 162 or the downstream tailpiece 172.

While specific and distinct embodiments have been shown in the drawings, various individual elements, or combinations of elements from the different embodiments may be combined with one another while in keeping with the spirit and scope of the present disclosure. Thus, an individual feature described herein only with respect to one embodiment should not be construed as being incompatible with other embodiments described herein.

It will be appreciated by those skilled in the art that various modifications and alterations could be made to the disclosure above without departing from the broad inventive concepts thereof. Some of these have been discussed above and others will be apparent to those skilled in the art. It is understood, therefore, that this invention is not limited to the particular embodiments disclosed, but it is intended to cover modifications within the spirit and scope of the present disclosure.

I claim:

1. A system for connecting an upstream-fluid conduit to a downstream-fluid conduit in fluid communication with a fluid-based heat-transfer device, the system comprising:
 a hose comprising a first hose end and a second hose end and a hose bore; and a port body having an exterior wall, a port-body-hose end with a port-body-hose opening, a port-body-connector end with a port-body-connector opening, a port-body bore extending between the port-body-hose opening and the port-body-connector opening, and a port aperture passing through the exterior wall and in fluid communication with the port-body bore, with the port-body-hose opening being sealingly, non-rotatably, and non-removably joined to the first hose end, with the port-body bore in fluid communication with the hose bore;

a first connector nut rotatably and non-removably coupled to the port-body-connector opening;

a second connector nut rotatably and non-removably coupled to the second hose end;

an upstream tailpiece having a conduit end configured to be sealingly connected to the upstream-fluid conduit and having a connector end removably connectable to the first connector nut;

a downstream tailpiece having a conduit end configured to be sealingly connected to the downstream-fluid conduit and having a connector end removably connectable to the second connector nut;

wherein the upstream tailpiece is configured to be removably connectable to the second connector nut, and the downstream tailpiece is configured to be removably connectable to the first connector nut.

2. The system according to claim 1, wherein the first connector nut has a first state wherein the first connector nut is rotatable with respect to the port body, and a second state wherein the first connector nut is fixed with respect to the port body, the second state providing for fixing of an orientation of the port body.

3. The system according to claim 1, wherein the exterior wall has a protrusion protruding exteriorly therefrom and encircling the port-body-connector opening, and the protrusion is configured to capture the first connector nut to limit an axial movement thereof.

4. The system according to claim 3, wherein the connector nut and the port body are configured to engage the connector end of the upstream tailpiece or the downstream tailpiece to prevent rotation of the port body.

5. The system according to claim 1, wherein the port aperture is surrounded by a port-aperture wall, and the port-aperture wall protrudes from the exterior wall of the port body.

6. The system according to claim 1, further comprising:
a valve having a valve body with a first valve-body end with a first valve-body opening, and a second valve-body end with a second valve-body opening;
a third connector nut rotatably and non-removably coupled to the first valve-body end;
wherein at least one of the upstream tailpiece or the downstream tailpiece is removably connectable to the third connector nut, so that the valve may be joined by way of the third connector nut to the third tailpiece.

7. A system for connecting to an upstream-fluid conduit and a downstream-fluid conduit in fluid communication with a fluid-based heat-transfer device, the system comprising:
a hose comprising a first hose end and a second hose end and a hose bore; and
a first-port body having a first-exterior wall, a first-port-body-hose opening, a first-port-body-connector opening, a first-port-body bore extending between the first-port-body-hose opening and the first-port-body-connector opening, and a first-port aperture passing through the first-exterior wall and in fluid communication with the first-port-body bore, with the first-port-body-hose opening being sealingly, non-rotatably, and non-removably joined to the first hose end, with the first-port-body bore in fluid communication with the hose bore;

a first connector nut rotatably and non-removably coupled to the first-port-body-connector opening;

a second-port body having a second-exterior wall, a second-port-body-hose opening, a second-port-body-connector opening, a second-port-body bore extending between the second-port-body-hose opening and the second-port-body-connector opening, and a second-port aperture passing through the second-exterior wall in in fluid communication with the second-port-body bore, with the second-port-body-hose opening being sealingly, non-rotatably, and non-removably joined to the second hose end, with the second-port-body bore in fluid communication with the hose bore;

a second connector nut rotatably and non-removably coupled to the second-port-body-connector opening;

an upstream tailpiece having a conduit end sealingly connected to the upstream-fluid conduit and having a connector end removably and connectable to the first connector nut;

a downstream tailpiece having a conduit end sealingly connected to the downstream-fluid conduit and having a connector end removably connectable to the second connector nut; wherein the upstream tailpiece is configured to be removably connectable to the second connector nut, and the downstream tailpiece is configured to be removably connectable to the first connector nut.

8. The system according to claim 7, wherein the first connector nut has a first state wherein the first connector nut is rotatable with respect to the first-port body, and a second state wherein the first connector nut is fixed with respect to the first-port body, the second state providing for fixing of an orientation of the first-port body.

9. The system according to claim 7, wherein the first-exterior wall has a protrusion protruding exteriorly therefrom and encircling the first-port-body-connector opening, and the protrusion is configured to capture the first connector nut to limit an axial movement thereof; and
wherein the second-exterior wall has a protrusion protruding exteriorly therefrom and encircling the second-port-body-connector opening, and the protrusion is configured to capture the second connector nut to limit an axial movement thereof.

10. The system according to claim 9, wherein the first connector nut and the first-port body are configured to engage the connector end of the upstream tailpiece or the downstream tailpiece to prevent rotation of the first-port body, and the second connector nut and the second-port body are configured to engage the connector end of the upstream tailpiece or the downstream tailpiece to prevent rotation of the second-port body.

11. The system according to claim 7, wherein the first-port aperture is surrounded by a port-aperture wall, and the port-aperture wall protrudes from the second-exterior wall of the second-port body.

12. The system according to claim 7, further comprising:
a valve having a first valve-body end with a first valve-body opening, and a second valve-body end with a second valve-body opening;
a third connector nut rotatably and non-removably coupled to the first valve-body end; and wherein at least one of the upstream tailpiece or the downstream tailpiece is removably connectable to the third connector nut, so that the valve may be joined by way of the third connector nut to the third tailpiece.

13. A kit for connecting an upstream-fluid conduit to a downstream-fluid conduit in fluid communication with a fluid-based heat-transfer device, the kit comprising:
a hose comprising a first hose end and a second hose end and a hose bore; and
a port body having an exterior wall, a port-body-hose end with a port-body-hose opening, a port-body-connector end with a port-body-connector opening, a port-body bore extending between the port-body-hose opening and the port-body-connector opening, and a port aperture passing through the exterior wall and in fluid communication with the port-body bore, with the port-body-hose opening being sealingly, non-rotatably, and non-removably joined to the first hose end, with the port-body bore in fluid communication with the hose bore;
a first connector nut rotatably and non-removably coupled to the port-body-connector opening;
a second connector nut rotatably and non-removably coupled to the second hose end;
an upstream tailpiece having a conduit end configured to be sealingly connectable to the upstream-fluid conduit and having a connector end removably connectable to the first connector nut;
a downstream tailpiece having a conduit end configured to be sealingly connectable to the downstream-fluid conduit and having a connector end removably connectable to the second connector nut;
wherein the upstream tailpiece is configured to be removably connectable to the second connector nut, and the downstream tailpiece is configured to be removably connectable to the first connector nut.

14. The kit according to claim 13, wherein the first connector nut has a first state wherein the first connector nut is rotatable with respect to the port body, and a second state wherein the first connector nut is fixed with respect to the port body, the second state providing for fixing of an orientation of the port body.

15. The kit according to claim 13, wherein the exterior wall has a protrusion protruding exteriorly therefrom and encircling the port-body-connector opening, and the protrusion is configured to capture the first connector nut to limit an axial movement thereof.

16. The kit according to claim 15, wherein the connector nut and the port body are configured to engage the connector end of the upstream tailpiece or the downstream tailpiece to prevent rotation of the port body.

17. The kit according to claim 13, wherein the port aperture is surrounded by a port-aperture wall, and the port-aperture wall protrudes from the exterior wall of the port body.

18. The kit according to claim 13, further comprising:
a valve having a first valve-body end with a first valve-body opening, and a second valve-body end with a second valve-body opening; and
a third connector nut rotatably and non-removably coupled to the first valve-body end;
wherein at least one of the upstream tailpiece or the downstream tailpiece is removably connectable to the third connector nut, so that the valve may be joined by way of the third connector nut directly to the third tailpiece.

19. A kit for connecting to an upstream-fluid conduit and a downstream-fluid conduit in fluid communication with a fluid-based heat-transfer device, the kit comprising:
a hose comprising a first hose end and a second hose end and a hose bore; and
a first-port body having a first-exterior wall, a first-port-body-hose opening, a first-port-body-connector opening, a first-port-body bore extending between the first-port-body-hose opening and the first-port-body-connector opening, and a first-port aperture passing through the first-exterior wall and in fluid communication with the first-port-body bore, with the first-port-body-hose opening being sealingly, non-rotatably, and non-removably joined to the first hose end, with the first-port-body bore in fluid communication with the hose bore;
a first connector nut rotatably and non-removably coupled to the first-port-body-connector opening;
a second-port body having a second-exterior wall, a second-port-body-hose opening, a second-port-body-connector opening, a second-port-body bore extending between the second-port-body-hose opening and the second-port-body-connector opening, and a second-port aperture passing through the second-exterior wall in in fluid communication with the second-port-body bore, with the second-port-body-hose opening being sealingly, non-rotatably, and non-removably joined to the second hose end, with the second-port-body bore in fluid communication with the hose bore;
a second connector nut rotatably and non-removably coupled to the second-port-body-connector opening;
an upstream tailpiece having a conduit end configured to be sealingly connectable to the upstream-fluid conduit and having a connector end removably connectable the first connector nut;
a downstream tailpiece having a conduit end configured to be sealingly connectable to the downstream-fluid conduit and having a connector end removably connectable to the second connector nut;
wherein the upstream tailpiece is configured to be removably connectable to the second connector nut, and the downstream tailpiece is configured to be removably connectable to the first connector nut.

20. The kit according to claim 19, wherein the first connector nut has a first state wherein the first connector nut is rotatable with respect to the first-port body, and a second state wherein the first connector nut is fixed with respect to the first-port body, the second state providing for fixing of an orientation of the first-port body.

21. The kit according to claim 19, wherein the first-exterior wall has a protrusion protruding exteriorly therefrom and encircling the first-port-body-connector opening, and the protrusion is configured to capture the first connector nut to limit an axial movement thereof; and
wherein the second-exterior wall has a protrusion protruding exteriorly therefrom and encircling the second-port-body-connector opening, and the protrusion is configured to capture the second connector nut to limit an axial movement thereof.

22. The kit according to claim 19, wherein the first connector nut and the first-port body are configured to engage the connector end of the upstream tailpiece or the downstream tailpiece to prevent rotation of the first-port body, and the second connector nut and the second-port body are configured to engage the connector end of the upstream tailpiece or the downstream tailpiece to prevent rotation of the second-port body.

23. The kit according to claim 19, wherein the first-port aperture is surrounded by a port-aperture wall, and the port-aperture wall protrudes from the first-exterior wall of the first-port body.

24. The kit according to claim 19, further comprising:
a valve having a valve inlet and a valve outlet;
a third connector nut rotatably and non-removably coupled to valve inlet; and
a fourth connector nut rotatably and non-removably coupled to the valve outlet;
wherein at least one of the upstream tailpiece or the downstream tailpiece is connected in fluid communication with a third tailpiece, and the third tailpiece has a connector end removably connectable to both the third connector nut and the fourth connector nut, so that one of the valve inlet or the valve outlet may be selectively connected to the third tailpiece.

25. A method for connecting an upstream-fluid conduit to a downstream-fluid conduit in fluid communication with a fluid-based heat-transfer device, the method comprising:
sealingly connecting an upstream tailpiece at a conduit end thereof to the upstream-fluid conduit, the upstream tailpiece having a connector end removably connectable to a first connector nut;
sealingly connecting a downstream tailpiece at a conduit end thereof to the downstream-fluid conduit, the downstream-fluid conduit having a connector end removably connectable to a second connector nut;
engaging a connection device with the connector end of the upstream tailpiece and the connector end of the downstream tailpiece, the connection device comprising:
a hose comprising a first hose end and a second hose end and a hose bore; and
a port body having an exterior wall, a port-body-hose end with a port-body-hose opening, a port-body-connector end with a port-body-connector opening, a port-body bore extending between the port-body-hose opening and the port-body-connector opening, and a port aperture passing through the exterior wall and in fluid communication with the port-body bore, with the port-body-hose opening being sealingly, non-rotatably, and non-removably joined to the first hose end, with the port-body bore in fluid communication with the hose bore;
a first connector nut rotatably and non-removably coupled to the port-body-connector opening;
a second connector nut rotatably and non-removably coupled to the second hose end; and
wherein the upstream tailpiece is configured to be removably connectable to the second connector nut, and the downstream tailpiece is configured to be removably connectable to the first connector nut;
wherein the engaging the connection device with the connector end of the upstream tailpiece and with the connector end of the downstream tailpiece includes:
tightening the first connector nut with respect to the upstream tailpiece; and
tightening the second connector nut with respect to the downstream tailpiece.

26. The method of claim 25, further comprising, after completing the method of claim 25:
disengaging the first connector nut from the upstream tailpiece;
disengaging the second connector nut from the downstream tailpiece;
re-orienting the connection device and re-engaging the connection device with the connector end of the upstream tailpiece and the connector end of the downstream tailpiece by:
tightening the first connector nut with respect to the downstream tailpiece; and
tightening the second connector nut with respect to the upstream tailpiece.

27. A method for connecting an upstream-fluid conduit to a downstream-fluid conduit in fluid communication with a fluid-based heat-transfer device, the method comprising:
sealingly connecting an upstream tailpiece at a conduit end thereof to the upstream-fluid conduit, the upstream tailpiece having a connector end removably connectable to a first connector nut;
sealingly connecting a downstream tailpiece at a conduit end thereof to the downstream-fluid conduit, the downstream-fluid conduit having a connector end removably connectable to a second connector nut;
engaging a connection device with the connector end of the upstream tailpiece and the connector end of the downstream tailpiece, the connection device comprising:
a hose comprising a first hose end and a second hose end and a hose bore;
a first-port body having a first-exterior wall, a first-port-body-hose opening, a first-port-body-connector opening, a first-port-body bore extending between the first-port-body-hose opening and the first-port-body-connector opening, and a first-port aperture passing through the first-exterior wall and in fluid communication with the first-port-body bore, with the first-port-body-hose opening being sealingly, non-rotatably, and non-removably joined to the first hose end, with the first-port-body bore in fluid communication with the hose bore;
a first connector nut rotatably and non-removably coupled to the first-port-body-connector opening;
a second-port body having a second-exterior wall, a second-port-body-hose opening, a second-port-body-connector opening, a second-port-body bore extending between the second-port-body-hose opening and the second-port-body-connector opening, and a second-port aperture passing through the second-exterior wall in in fluid communication with the second-port-body bore, with the second-port-body-hose opening being sealingly, non-rotatably, and non-removably joined to the second hose end, with the second-port-body bore in fluid communication with the hose bore; and
a second connector nut rotatably and non-removably coupled to the second-port-body-connector opening;
wherein the upstream tailpiece is configured to be removably connectable to the second connector nut, and the downstream tailpiece is configured to be removably connectable to the first connector nut;
wherein the engaging the connection device with the connector end of the upstream tailpiece and with the connector end of the downstream tailpiece includes:
tightening the first connector nut with respect to the upstream tailpiece; and
tightening the second connector nut with respect to the downstream tailpiece.

28. The method of claim 27, further comprising, after completing the method of claim 27:
disengaging the first connector nut from the upstream tailpiece;

disengaging the second connector nut from the downstream tailpiece;
re-orienting the connection device and re-engaging the connection device with the connector end of the upstream tailpiece and the connector end of the downstream tailpiece by:
  tightening the first connector nut with respect to the downstream tailpiece; and
  tightening the second connector nut with respect to the upstream tailpiece.

* * * * *